3,441,941
FILM STRIP PRECISION DYNAMIC PLOTTING PROJECTOR

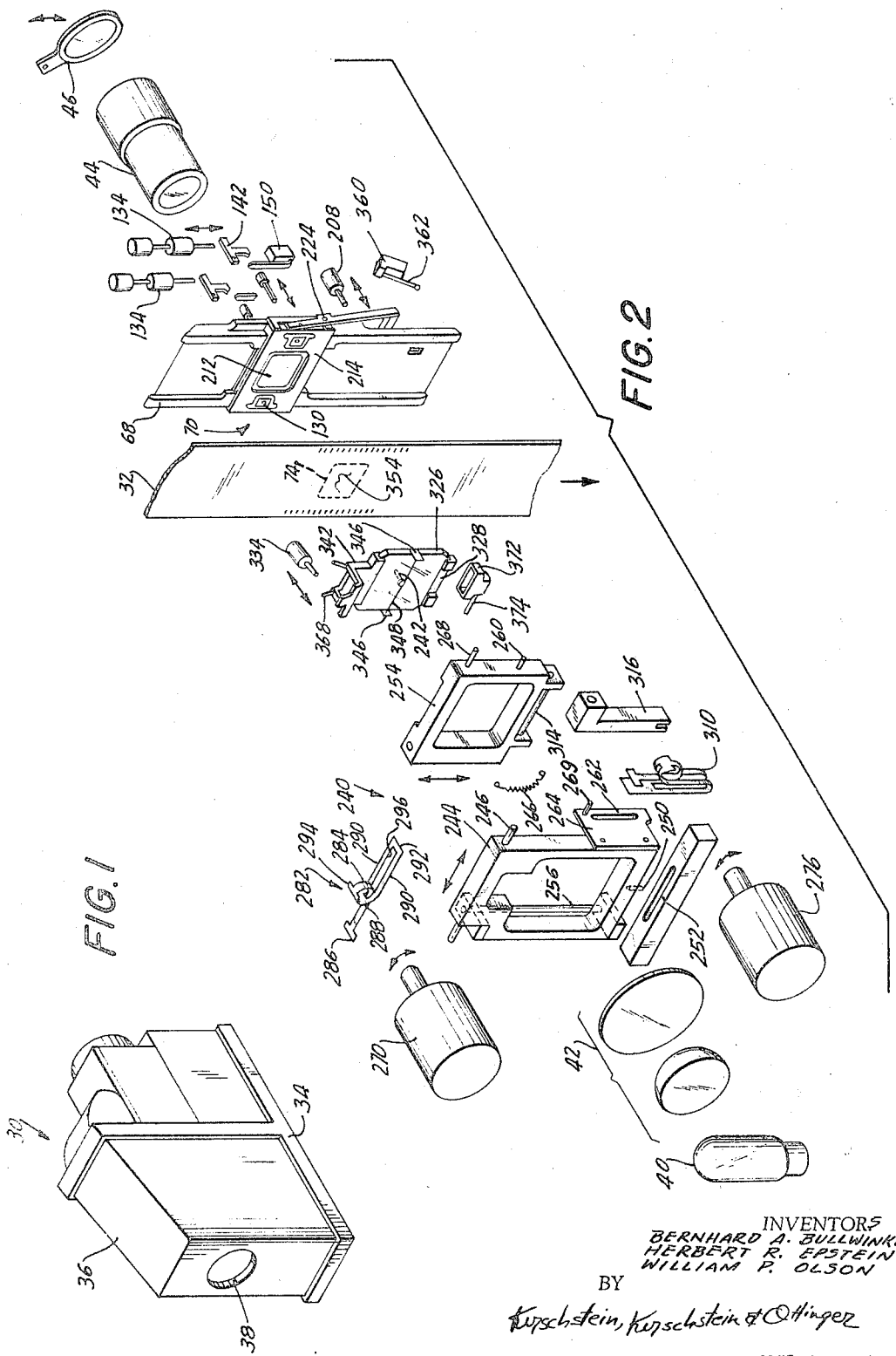

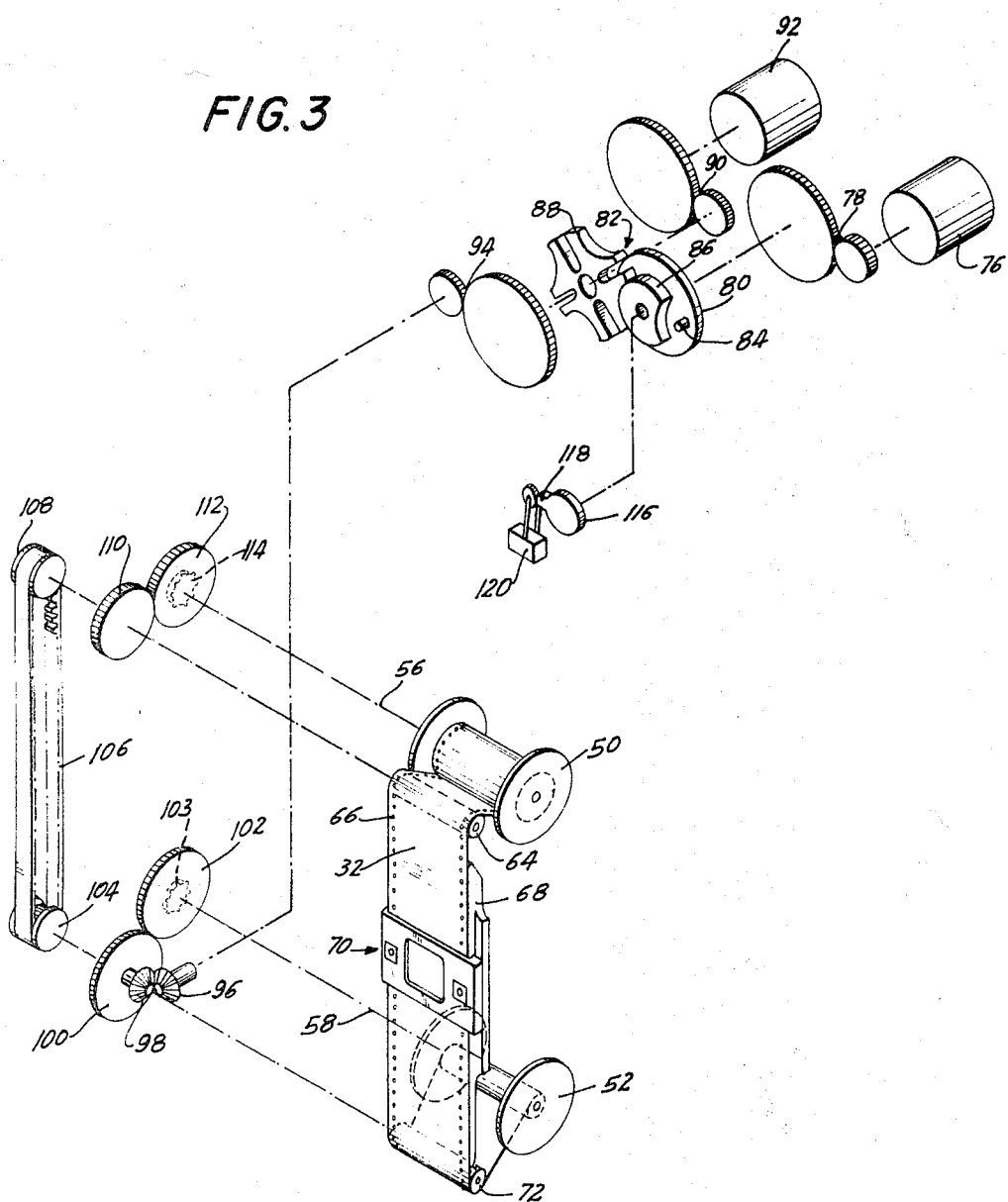

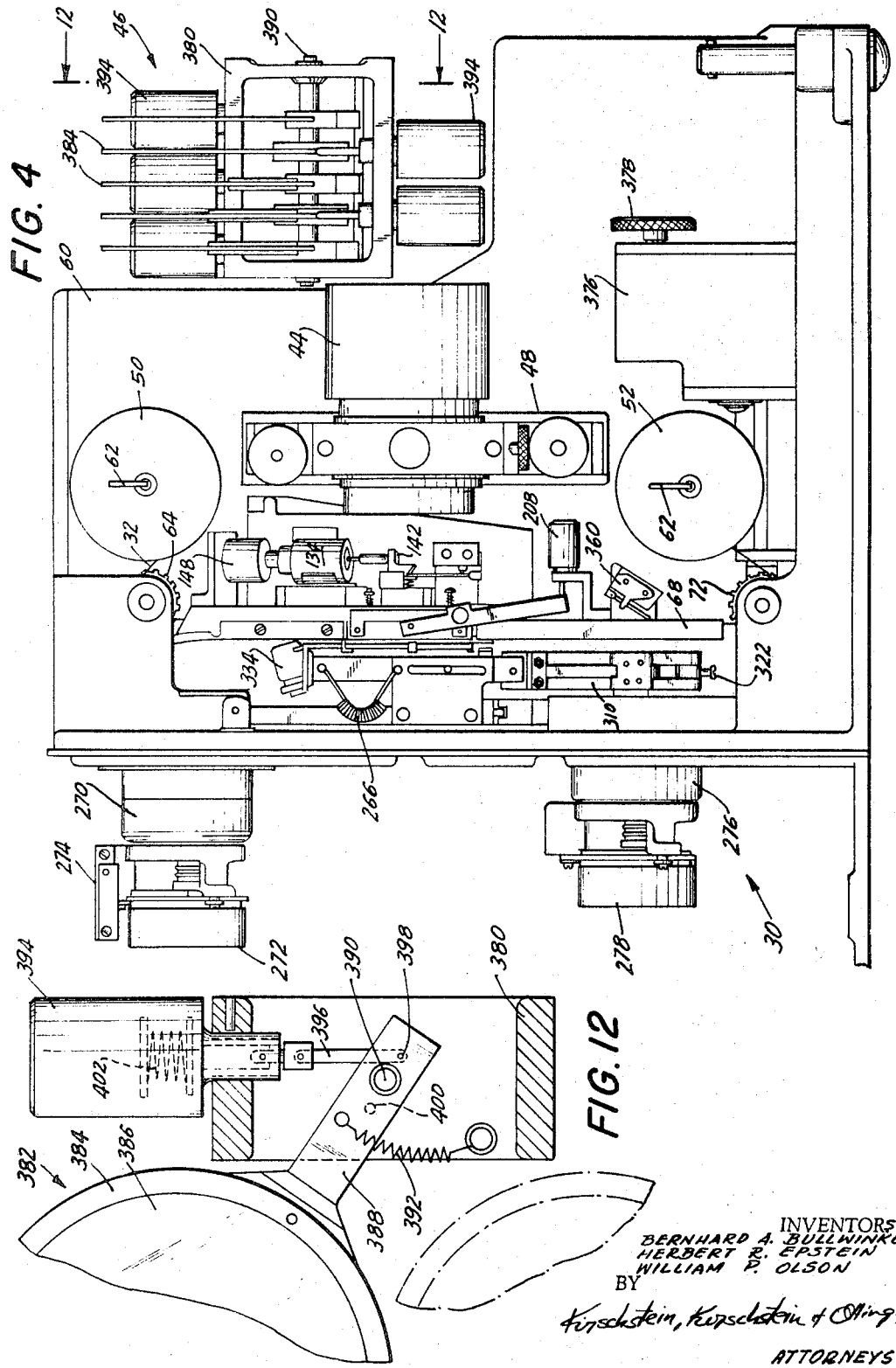

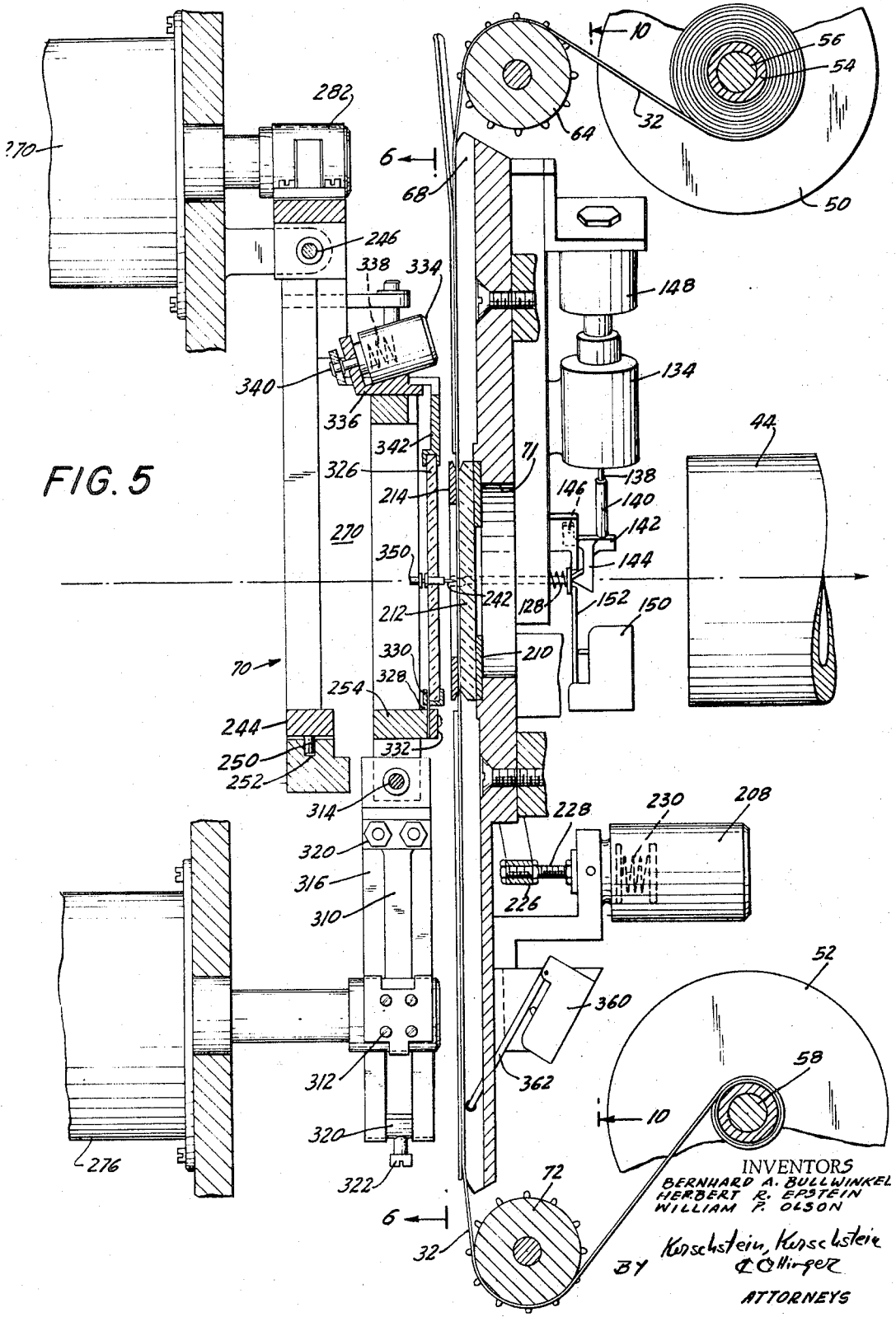

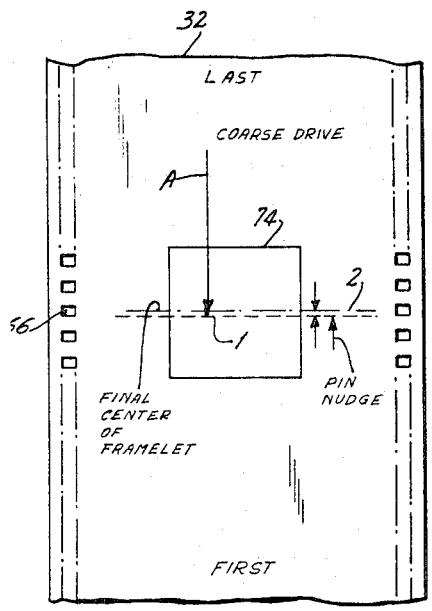
FIG. 13
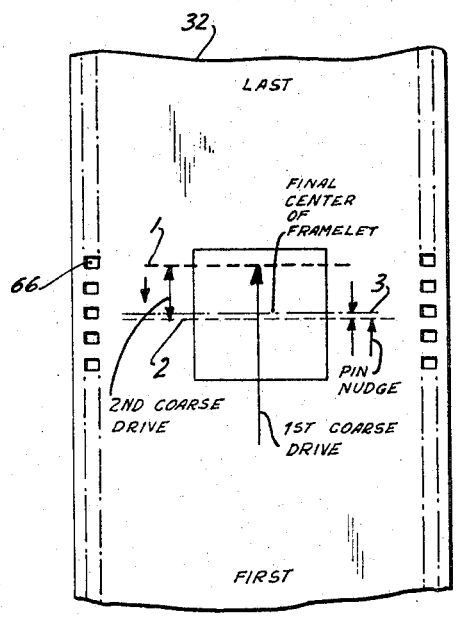
FIG. 14
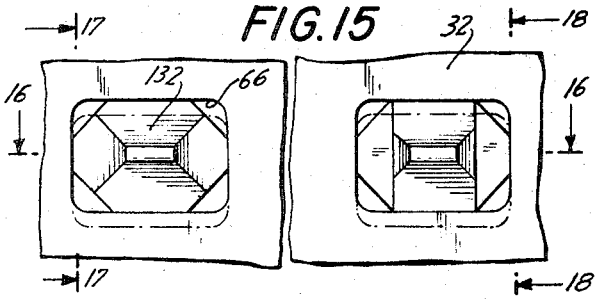
FIG. 15
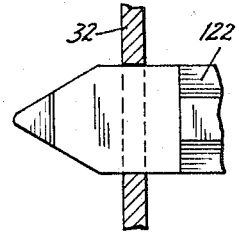
FIG. 18
FIG. 17
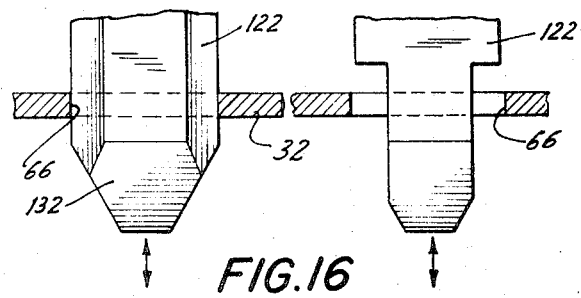
FIG. 16

Bernhard A. Bullwinkel, Roslyn Heights, Herbert R. Epstein, Woodmere, and William P. Olson, College Point, N.Y., assignor to Belock Instrument Corporation, N.Y., a corporation of New York
Filed May 9, 1966, Ser. No. 548,544
Int. Cl. G01d 9/16
U.S. Cl. 346—17                                         21 Claims

ABSTRACT OF THE DISCLOSURE

A dynamic plotting projector comprising a long length of transparent film having an opaque scribable coating on one surface thereof. The film is intermittently fed between two reels past a plotting station having a film gate therein. A glass plate supports the front of the film at the plotting station. A scribing stylus is located behind the film at the plotting station and is arranged to be moved into contact with the coating on the film and then from point to point on the film while the film is stationary. A projection lamp shines light through the track of the stylus in the coating and the modulated beam passing through the film gate is directed by a projection lens on to a display surface.

---

This invention relates to a film strip precision dynamic plotting projector for information display.

Typical dynamic precision plotting projectors of the prior art are shown in United States Letters Patent No. 2,859,659, issued Nov. 11, 1958, and No. 3,151,927, issued Oct. 6, 1964. Such previous projectors employ a movable stylus to scribe lines in an opaque coating of a glass slide. During scribing the slide is positioned in front of an intense source of illumination which projects a beam of light modulated by the scribed lines through a projection lens onto a screen for display purposes.

These previous projectors have many disadvantages that arise from use of opaque coated individual glass slides. Thus, the cost of the slides is high; the slides are bulky and fragile, requiring careful handling and considerable space for storage; the slides, since each is separate from every other, inhibit fast retrieval; and the slides are heavy and require complex mechanisms for automatic handling. A projector for handling slides is necessarily quite heavy and the slides can not easily be located with precision, thereby incurring difficulty when it is necessary to reposition an already scribed slide for the same to receive fresh scribed information.

The present invention is principally characterized by a novel projection system which overcomes the foregoing disadvantages by utilizing a film strip in place of glass slides. The film strip is adapted to have any of selected portions thereof, hereinafter called "framelets," rapidly and precisely located in scribing (plotting) position.

The use of a film strip instead of glass slides considerably lowers the cost of the plotting medium (herein the film strip); provides a less bulky and more rugged plotting medium than glass slides; enables a faster retrieval system to be employed; lessens the weight of the plotting medium; makes the plotting medium easier to store; allows a cleaner operation to be obtained; permits the use of lighter projector parts; and increases the capability of greater precision when a framelet has to be relocated in plotting position for receiving subsequently scribed information.

The new projector incorporates a completely new and unusual design, both as to individual parts and as to the relationship between the parts, in order to enable a strip of film to be used as the plotting medium. Thus, the new projector includes a plane means for supporting the film in its plotting position, so that despite the inherent flexibility of film it is backed up in such a manner as to form a firm plane plotting surface. The new projector also includes a scribing assembly such that the scribing stylus, inclusive of parts movable therewith, has a low Z inertia and a high Z compliance, Z being the direction perpendicular to the plane of the film at the plotting station. This enables the stylus to approach the film rapidly when it is moved into scribing position without puncturing the film and also enables the stylus to shift quickly in a Z direction so as to speedily transverse irregularities on the surface of the film without furrowing the same during scribing. Still further, the new projector includes a pressure assembly for holding the film flat against the plane film supporting means in order to arrive at optimum flatness of the framelet at the plotting station. Additionally, the new projector includes a film registration means for accurately positioning any selected famelet at the plotting station whereby despite the fact that the film constitutes a long strip, any given framelet can be positioned and repositioned at the plotting station without any observable variation in its X or Y location, this despite a substantial enlargement that may be provided by the projection lens. In the latter connection the new projector preferably includes film transport and registering mechanisms which are such that, regardless of the direction of movement of the film from a higher numbered to a lower numbered framelet or vice versa, the transport mechanism invariably positions any selected framelet displaced slightly from its final plotting position and on the same side of said position, and the registering mechanism will always nudge the film in the same direction to its final plotting position, thereby obtaining an exactly repeatable final plotting position.

The scribing assembly for moving the X and Y stylus carriages have in previous projectors, exemplified, for example, in the above United States Letters Patent, been susceptible to backlash and errors ensuing therefrom. The new projector of the present invention avoids this difficulty and provides a novel precision means, including a unique arrangement of components, for traversing the X and Y stylus carriages.

It is customary when displaying information with dynamic plotting projectors to employ several such projectors in proximity to throw images in overlapping relationship upon a single screen area, the different projectors furnishing different information. In order to distinguish the different information, filters of different colors have been interposed in the projector beams. Heretofore, it has been usual, as shown, for example, in United States Letters Patent No. 3,151,927, to furnish each projector with a filter wheel that was turned to any given position in order to tint the associated beam to any desired color. This has the drawback that during a change more than one color appears in association with the projected information. The present invention employs a novel arrangement in which the filters are so supported and manipulated as to avoid multiple color changes where any given beam is altered from one color to another.

Other aspects of our invention in part will be obvious and in part will be pointed out hereinafter.

Our invention accordingly consists in the features of construction, combinations of elements, and arrangements of parts which will be exemplified in the device hereinafter described and of which the scope of application will be indicated in the appended claims.

In the accompanying drawings in which is shown one of the various possible embodiments of our invention.

FIG. 1 is a three-quartered isometric view of a projector embodying our invention;

FIG. 2 is an exploded isometric view of the optical system and the scribing assembly of said projector;

FIG. 3 is an exploded isometric view of the film transport system;

FIG. 4 is a side elevational view of the projector with its cover removed and illustrating the film transport mechanism, the film gate, the pressure plate, the optical system and the scribing assembly;

FIG. 5 is an enlarged fragmentary sectional view of the projector taken along a vertical plane passing through the center of the plotting station, said plane being denoted by the line 5—5 in FIG. 6;

FIG. 12 is an enlarged sectional view taken substantially along the line 12—12 of FIG. 4 and illustrating a detail of the arrangement for selecting a color filter;

FIG. 13 is a front view of a fragment of a film strip at the plotting station and showing successive motions of the strip to final plotting position when the strips is moved from a higher numbered framelet to a lower numbered framlet;

FIG. 14 is a view similar to FIG. 13, but showing the successive motions experienced by the strip as it is moved from a lower numbered framelet to a higher numbered framelet;

FIG. 15 is a fragmentary view of the operative ends of the registration pins and of film sprocket holes associated therewith;

Figure 19:
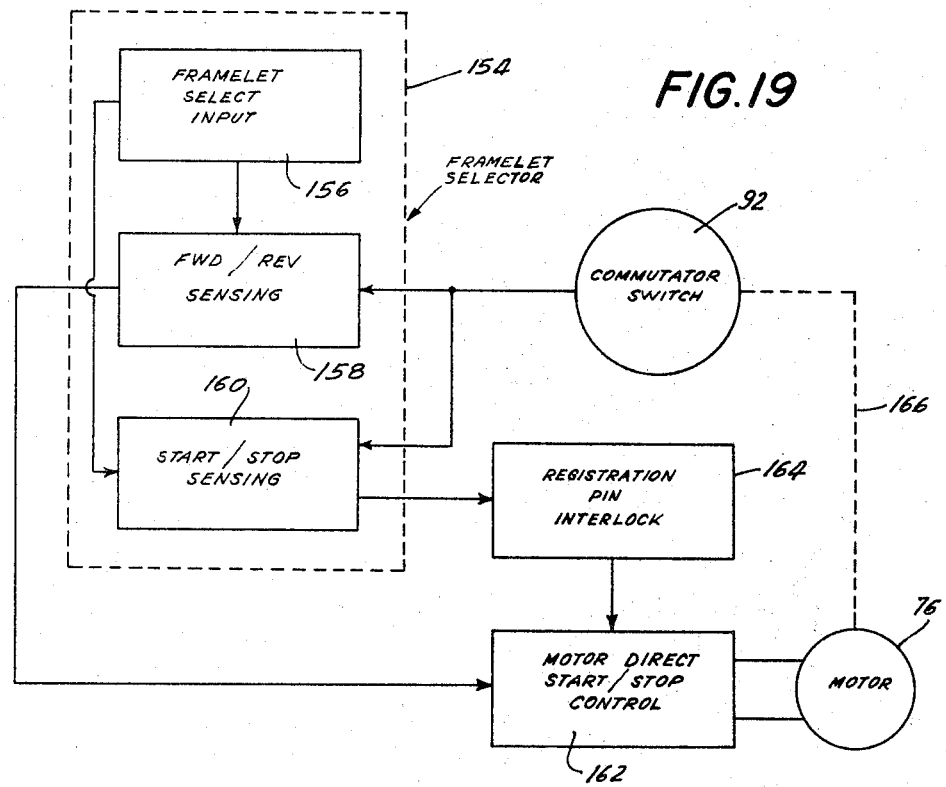
Figure 21:
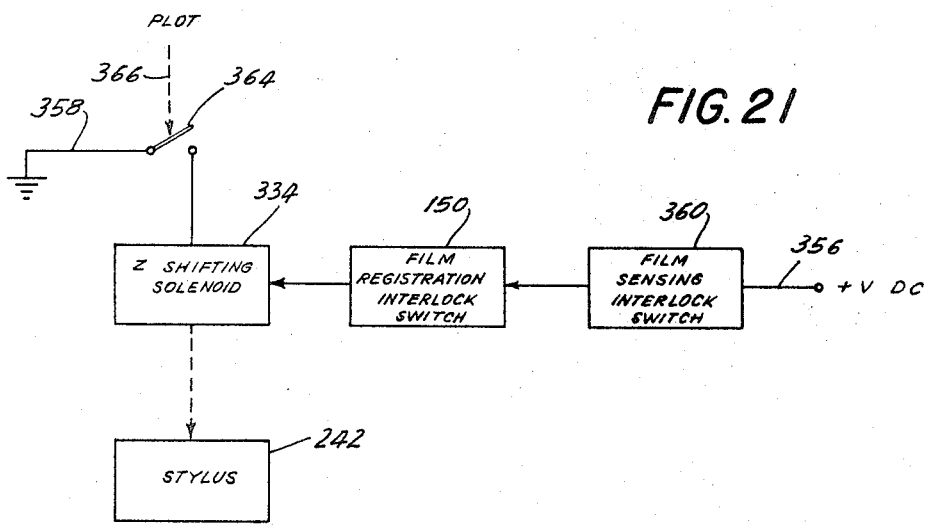
Figure 20:
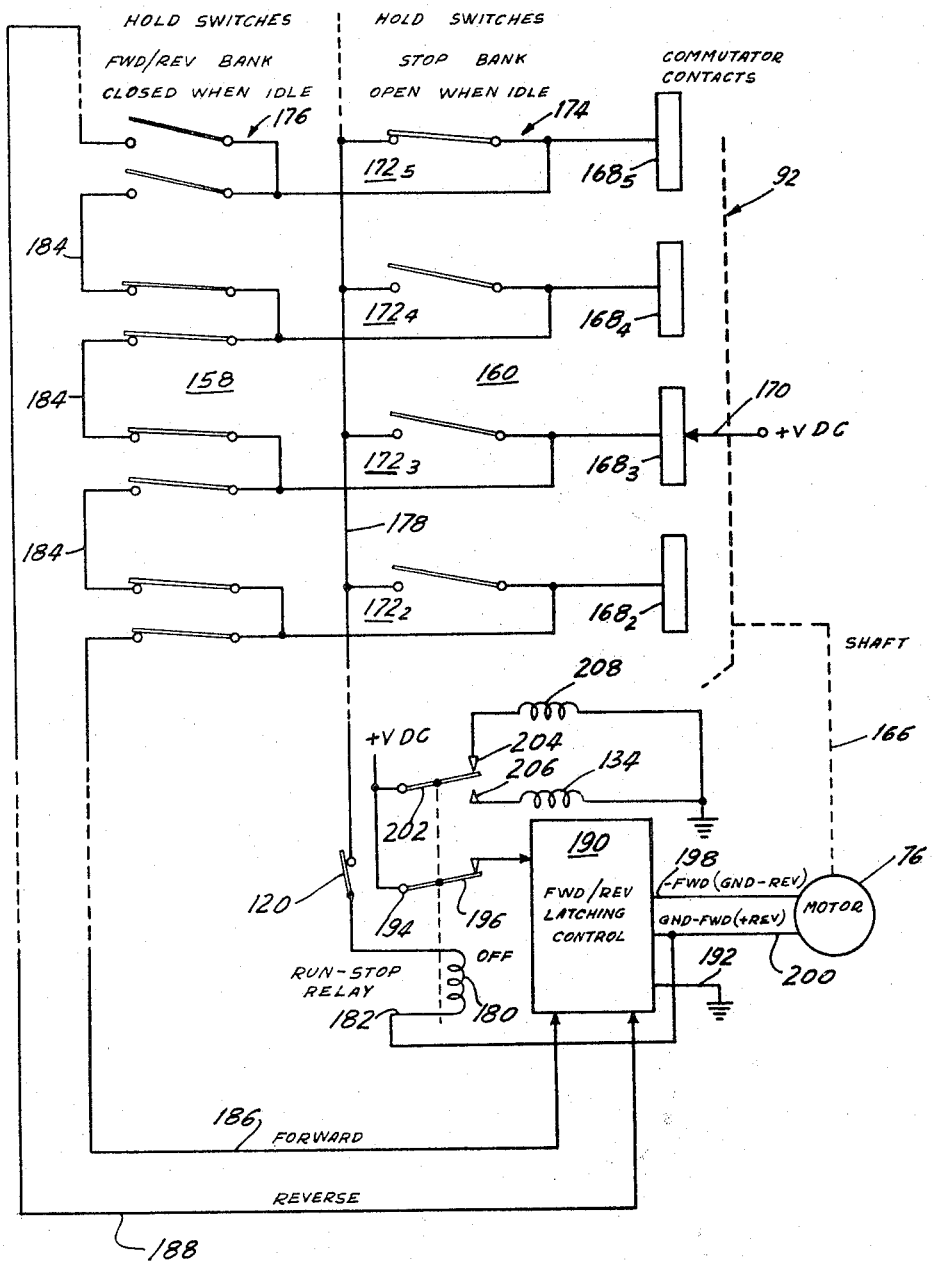

FIGS. 16, 17 and 18 are enlarged fragmentary views taken along the lines 16—16, 17—17 and 18—18, respectively, of FIG. 15;

FIG. 19 is a block diagram of the film position circuit;

FIG. 20 is a schematic diagram of the forward/reverse sensing and the start-stop sensing blocks of the film position circuit; and FIG. 21 is a block diagram of the stylus control circuit.

Referring in detail to the drawings, the reference numeral 30 denotes a film strip precision dynamic plotting projector constructed in accordance with and embodying our invention, the same being of a special design which renders it capable of utilizing a film strip 32 as the plotting medium. The projector is mounted on a base 34 (see FIG. 1) which supports the various projector components and the front of which is enclosed by a cover 36 having a projection opening 38 therein.

The projector includes a suitable source of high intensity illumination, as, for example, an incandescent or xenon light source 40 which is supported at the back end of the base and which is provided with the usual reflector and cooling fan (not shown). A set 42 of condensing lenses is located in front of the light source and is arranged to cast a beam of light forwardly toward the projection opening 38. The condensing lenses are located so as to cast an intense beam of light upon the film 32 at the plotting station so as to uniformly illuminate the complete framelet.

In front of the plotting station is located a projection lens 44 and a filter bank 46. The projection lens is carried by a lens mount 48 which is constructed in a well known manner to shift under the control of an operator in X and Y directions in a vertical plane perpendicular to the optical axis of the projection lens, thereby to adjust the location of an image cast by the projector on a screen so that such image may be brought into proper coordinate relationship with other images cast on the same screen by one or more other projectors. The projection lens and its mount and the plotting station are located within the cover 36 while the source of illumination and its associated equipment are located behind the cover.

The film transport system (see FIGS. 3–5, 8, 10, 11 and 13–20) includes an upper spool 50 and a lower spool 52 about which the ends of the film strip 32 are wound (see FIGS. 3 and 5), so that when the spools are turned the film strip will be shifted to a selected extent from one spool to the other, depending upon the direction of rotation of the spools. Suitable means guides the film strip to and past the plotting station between the two spools. When the film is to be moved downwardly through the plotting station both spools are driven in a clockwise direction as viewed in FIG. 5, and when the film is to be moved upwardly through the plotting station both spools are turned in a counterclockwise direction as viewed in the same figure. The spools are of standard construction in that each includes a pair of flanges connected by a hollow hub 54. The hubs are dimensioned to make sliding fits with spool drive shafts, there being two of the later, to wit, an upper spool drive shaft 56 and a lower spool drive shaft 58. Each spool drive shaft 56, 58 is mounted on a stationary vertical wall 60 upstanding from the base of the projector. The free ends of the shafts pivotally mount retainer arms 62 to hold the spools in place on their associated shafts. Each shaft includes a locking spline (not shown) which engages a locking notch in the hub of this corresponding spool, so that when the retaining arms 62 are in closed position the spools will turn with their shafts.

The film strip 32 as it leaves the upper spool is trained about an upper drive sprocket 64 having equiangularly spaced sprocket pins radiating therefrom adjacent opposite ends thereof. These engage matchingly spaced sprocket holes 66 running along the edges of the film strip in a conventional manner. After leaving the upper film sprocket the film strip turns down to engage a vertically extending film track 68 which provides a rearwardly facing surface against which at least the edges of the film strip bear. The track is so oriented that the film strip will be guided vertically in a plane perpendicular to the longitudinal axis of the projection lens. A plotting station 70 including a film gate 71 is located intermediate the ends of the film track. Continuing to follow the path of travel of the film strip as it moves from the upper spool to the lower spool, said film strip after leaving the plotting station moves down the lower portion of the track 68 and around a lower drive sprocket 72 similar to the upper sprocket 64. From the lower drive sprocket the film strip rides onto the hub of the lower spool 52. Both sprockets and both spool shafts are driven for any coarse movement of the film strip so as to minimize high local stresses in the film strip, thereby preventing distortion of the strip and the sprocket holes.

The film transport system also includes a suitable mechanism for driving the film in either direction so as to shift the film exposed at the plotting station from one section of the film, hereinafter designated a "framelet" and which is shown in dotted lines as a rectangle 74 in FIG. 2 and in solid lines in FIGS. 13 and 14, to any other selected framelet. This mechanism is best shown in FIG. 3.

It includes a film transport motor 76 (see also FIGS. 19 and 20) the output shaft of which is connected through a reduction gear train 78 to the input element 80 of a Geneva drive 82. The input element, as is usual, includes an eccentric pin 84 and a recessed concentric circular locking disc 86. The output element of the Geneva drive is a Geneva wheel 88. The Geneva drive is of a standard type and provides an intermittent rotation of the Geneva wheel each time that the pin 84 first engages and then disengages one of several radial slots in the Geneva wheel the locking disc preventing movement of the Geneva wheel when it engages with circular sectors between the slots at such time as the Geneva wheel is not being advanced. Thus, a steady rotary motion of the motor 76 is transduced by the Geneva drive into an intermittent rotary motion of the Geneva wheel having spaced film advancing phases with interposed stationary film phases.

The output of the Geneva drive, i.e., the Geneva wheel 88, is connected by a reduction gear train 90 to a commutator, i.e., counting switch, 92 (see also FIGS. 19 and 20). In addition, the Geneva output element 88 is connected by a stepup gear train 94 to the upper and lower drive sprockets 64, 72 and to the upper and lower spool shafts 56, 58. Specifically, the output gear of the reduction gear train 94 turns a drive bevel gear 96 which meshes with a driven bevel gear 98. The axis of the gear 98 is horizontal and coincident with the axis of the lower drive sprocket 72. Said bevel gear is connected to be fast to the spocket 72 so that rotation of the gear turns the sprocket. The connection between the gear 98 and the sprocket 72 is a rigid, i.e., nonslip, one.

Also fast to the bevel gear 98 is a pinion 100 that meshes with a second pinion 102 of the same size. The pinion 102 is coaxial with the lower spool drive shaft 58 and is connected thereto by a slip clutch 103.

The bevel gear 98 also turns the upper drive sprocket 54 and the upper spool 50. To this end the bevel gear 98 is fixed to a lower toothed pulley 104 about which there is trained an endless toothed belt 106. The belt is also trained about an upper toothed pulley 108 aligned with the upper drive sprocket 64 and fast thereto so as to turn therewith without slipping. Hence, when the Geneva wheel experiences one intermittent step of rotation, it will, through the drive mechanism just described, intermittently rotate the drive sprockets 64, 72 one step, their direction of rotation depending upon the direction of rotation of the motor 76 and being such as to intermittently advance the film strip 32 one step either upwardly or downwardly past the plotting station. A proper number of turns of the motor thereby will move the film strip from the location of any given framelet at the station to the location of some other selected framelet at the station.

We have used the term "location" of the film strip at the plotting station in a broad sense in connection with the film transport system, inasmuch as the initial location of a given framelet by the motor 76 is a coarse location, i.e., not exact or fine, the final location being accomplished by means of a registration mechanism including pins which will be described later.

The upper film spool 50 is driven at the same time as the upper film drive sprocket 64, the drive of said spool being accomplished by a pinion 110 which turns with the upper toothed pulley 108, being fast thereto, and a pinion 112 in mesh with the pinion 110. Like the proportioning between the pinions 100 and 102, the pinions 110, 112 are of like size. The pinion 112 turns the spool 50 through a slip clutch 114. It now will be apparent that when the film strip is driven downwardly past the plotting station, it will be positively advanced in an intermittent fashion by the upper and lower sprockets 64, 72 being supplied by one spool and taken up by the other spool depending upon the direction of feed.

The slip clutches 103, 114 will prevent the sprocket holes from being deformed.

The input element 80 of the Geneva drive also rotates a film drive stop switch cam 116 the actuating lobe 118 of which cooperates with a feeler of a film drive stop switch 120 (see also FIG. 20). Said film drive stop switch is a momentary switch with normally open contacts which are closed when the actuating element of the switch is engaged by the lobe 118. Said lobe is so positioned with respect to the input element 80 that it will engage and operate the switch when the drive pin 84 has left a radial slot of the Geneva wheel and the concave sector between said radial slots is engaged by the recessed circular locking disc 86, whereby said switch 120 will be operated while the film strip is stationary.

The sprockets 64, 72 are driven in synchronism. The spacing between the sprockets is such and the sprocket pins are so located that the length of the film between the sprockets is slightly slack, i.e., is slightly greater than the spacing between the sprockets, e.g., twenty thousandths of an inch.

Inasmuch as the image which is projected from the film strip may be very greatly enlarged when it is cast onto a screen, for example, enlarged over 200 times in X and in Y, and since framelets with information thereon may be repositioned at the plotting station for redisplay and for further scribing of information to be displayed, it is important in the use of the new film strip projector to locate any selected framelet at the plotting station with great precision (less than one thousandth of an inch). The film transport mechanism is not sufficiently accurate for this purpose since the arrangement for stopping the motor when a selected framelet is at the plotting station can not be economically made precise enough and since all backlash in the transport system cannot be economically eliminated. Hence, the film transport mechanism is provided only for the purpose of what is referred to herein as a "coarse" drive, which is to say, a drive that will locate a framelet near but not quite at the exact final position it must occupy at the plotting station prior to display or plotting thereon.

To arrive at this precise final position there additionally is employed a "fine" registration mechanism which constitutes a "nudging" means in the form of registration pins that engage sprocket holes of the film strip adjacent a selected framelet and "inch" the film strip into its exact final position for plotting and for display. It may be mentioned at this point that the fine registration mechanism for the sake of repeatability always inches the selected framelet into its final position by movement of the film strip in the same direction, regardless of whether the film strip is moved by the transport mechanism from a higher framelet position to a lower framelet position, or from a lower framelet position to a higher framelet position.

More particularly, in the new projector, the inching means (registration mechanism) moves the film strip and selected framelet in a direction towards the lower numbered end of the film strip. The manner in which this is accomplished is best shown in FIGS. 13 and 14. FIG. 13 illustrates the sequence of steps for proceeding from a lower numbered framelet to a higher numbered framelet. The arrow A in this figure shows the direction of coarse drive furnished by the transport mechanism, the same being such that the film strip is moved from the upper to the lower spool through the plotting station. The motor 76 and its connection to the driving sprockets is so arranged and controlled by the commutator switch 92 that any selected framelet 74 invariably is positioned at the termination of the coarse drive with the center of the framelet denoted by the transverse dotted line 1, slightly below the final plotting position desired for the framelet. Thereafter, the fine driving means (the registration mechanism) shifts the film strip and the framelet so that the new location of the transverse center line of the framelet indicated by a dot-and-dash line is at the position denominated 2 in FIG. 13. It will be observed that the center of the framelet moves from position 1 to position 2 which, in the new projector, is toward the low numbered framelet end of the film strip.

When the film strip is to be moved from a higher numbered framelet to a lower numbered framelet the sequence of events depicted in FIG. 14 takes place. The first coarse drive, which is in the direction from a higher numbered framelet to a lower numbered framelet, moves the center line of the selected framelet to position 1 denoted by the transverse dotted line which is below, as shown in said figure, the final center line position of the framelet. Then, by a means hereinafter to be described, a second coarse drive comes into play which moves the center line of the framelet from position 1 to position 2. In position 2 the center line of the framelet is slightly below the final position. Thereafter, the fine inching means shifts the center line of the framelet to its final position denoted by the reference numeral 3 and the dot and dash transverse line. Thus, in the sequence of events shown in FIG. 14, the last and fine inching movement of the film strip in the framelet is from the higher numbered end of the film strip toward the lower numbered end of the film strip, as it was with the sequence of events illustrated in FIG. 13.

The registration mechanism employed to secure the final fine inching movement of the film strip after the coarse drive of the motor 76 has come to a halt, is best shown in FIGS. 5, 8 and 13–18. This final movement, it should be mentioned, is a very small one, for instance in the order of fifteen thousandths of an inch or less. The last coarse movement of the motor 76 will position the framelet within approximately this range of fifteen thousandths of an inch of final position, so that the inching movement only has to move the film strip such a tiny distance to a precise final plotting position. Essentially, the fine inching means (registration mechanism) constitutes one, and preferably two, registration pins which enter sprocket holes adjacent opposite edges of the film strip at or adjacent the plotting station. Since the pins are located at stationary sites on the film track they can be precisely positioned (within less than one thousandth of an inch) so that they will reposition any selected framelet with great accuracy. The pins will not be in exact registry with the sprocket holes then adjacent them at the plotting station at the end of a coarse drive, but the discrepancy is quite tiny—as indicated above, about fifteen thousandths of an inch or less in the illustrated projector—so that the pins merely have to nudge the sprocket holes, and thereby the film strip, the last slight tiny amount to bring the framelet then at the plotting station into precisely its proper position for plotting or projection. Hence, the registration pins are, in effect, pilot pins which will correct the slight misregistration, always in the same sense, which then deliberately exists between the selected framelet and the plotting station.

Figure 6:
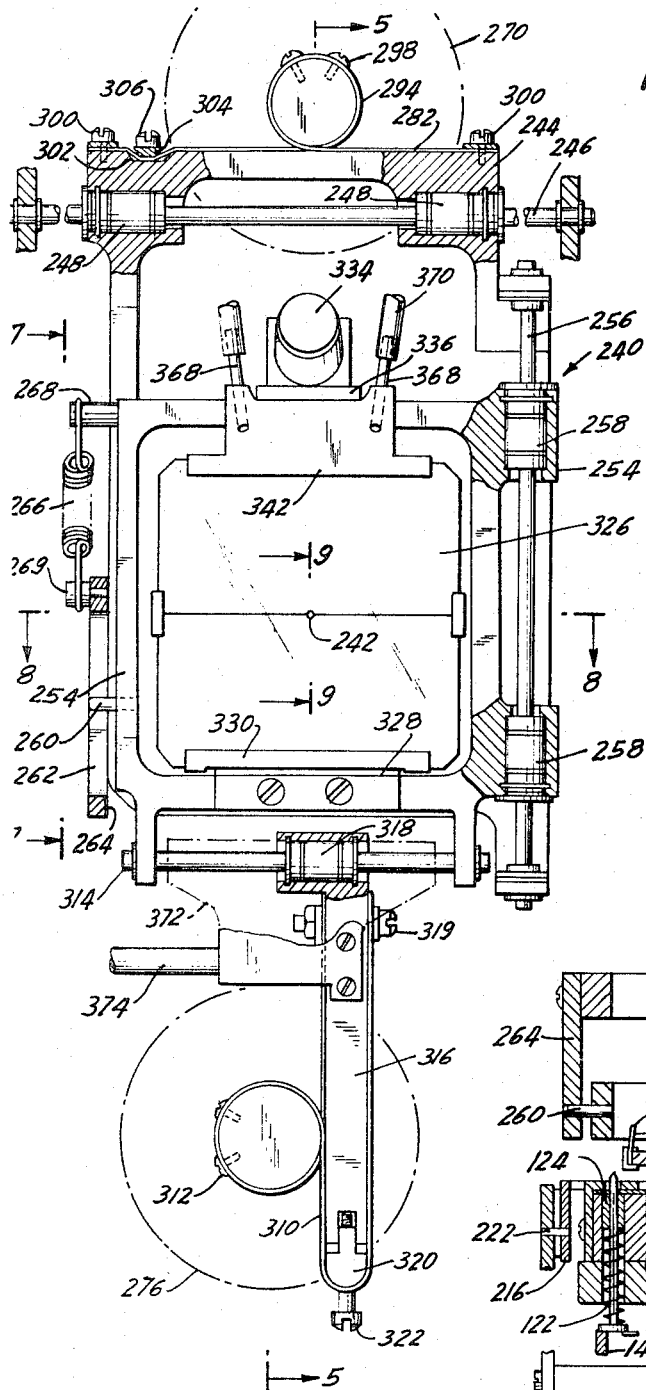
FIG. 6 is a partially fragmentary elevational view taken substantially along the line 6—6 of FIG. 5, the same looking rearwardly from directly in front of the scribing assembly.
Figure 7:
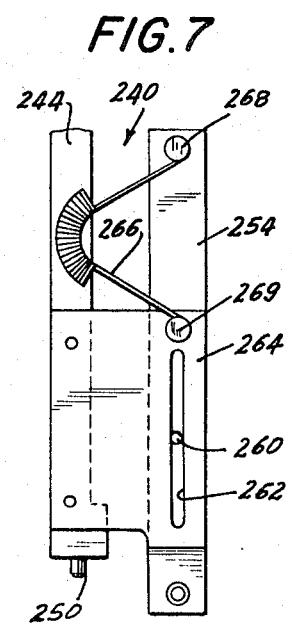
FIG. 7 is a fragmentary view taken substantially along the line 7—7 of FIG. 6 and illustrating one connection between the X and Y carriages of the scribing assembly.
Figure 8:
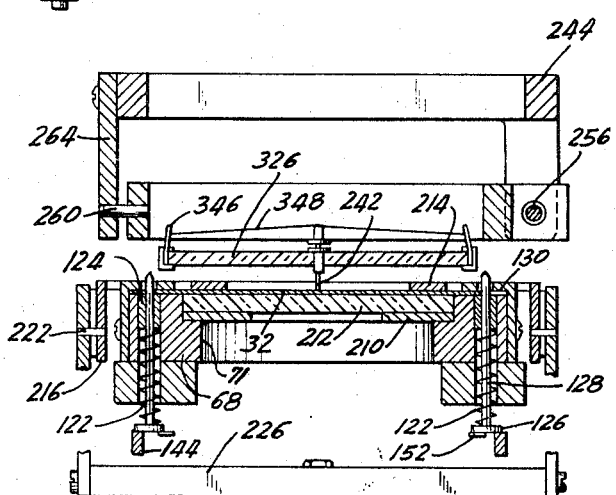
FIG. 8 is a sectional view taken substantially along the line 8—8 of FIG. 7 and illustrating various details of the X and Y carriages and of the plotting station.

The registration pins are denoted by the reference numeral 122 and are best seen in FIG. 8. Said pins are elongated, noncircular, slender shafts which are precision slidably mounted in front-to-back bushings 124 secured in the film track 68 adjacent the plotting station. The pins extend wholly through the film track from front to back and each pin is located in the path of travel of an associated line of sprocket holes. The front ends of the pins, i.e., the ends facing towards the projection lens, are formed with heads 126 and the pins are urged forwardly by helical springs 128 compressed between the heads 126 and the bushings 124. The rear ends of the bushings are flush with the rear face of the film track at the plotting station. When the registration pins are in scribing (plotting) position the rear tips thereof pass through the mating sprocket holes in the film strip and through openings in pin back-up plates 130.

The rear ends of the pins are rearwardly tapering to facilitate their easy entry into the mating sprocket holes and to permit said ends to cam the sprocket holes, and thereby the film strip, into the exactly correct position for the framelet located at the plotting station. Such configuration of the rear ends of the pins is shown in FIGS. 15–18. The left-hand pin 122 of FIGS. 15–17 has the tip of its rear end formed into the shape of a truncated rectangular pyramid with chamfered corners to clear the rounded corners of the sprocket holes 66. The Y dimension of the pins immediately forward of the rear ends is substantially equal to the Y dimension of the sprocket holes, optionally being very slightly less than the Y dimensions of said holes, e.g., a thousandth of an inch less. The X dimension of the left-hand pin 122 is substantially equal to the X dimension of the sprocket holes and it has been found that it can match the X dimension of the sprocket holes even more closely than the Y dimension of the pin matches the Y dimensions of the holes. For example, the X dimension of the left-hand pin 122, although slightly less than the X dimensions of the sprocket holes, may be less by only a fraction of a thousandth of an inch.

When a framelet is in its last coarse position prior to the fine inching motion which will be imparted to the film strip by nudging action of the registration pins, the sprocket hole 66 for that framelet which is to be engaged by the left-hand registration pin will be slightly below the registration pin 122, e.g., up to fifteen thousandths of an inch below, and for instance is in the dot and dash line position shown at the left-hand side of FIG. 15. At this time the registration pin 122 and indeed both registration pins 122 are in their forward position in which they are clear of the film strip, it being apparent that the film strip could not have been advanced unless the registration pins were in an out-of-the-way position. To effect the pin nudging movement of the film strip and framelet the registration pins then are moved rearwardly. At this time the upper Y face 132 of the rear truncated rectangular pyramidal tip of the left pin will engage the upper edge of the sprocket hole 66 and will cam the sprocket edge, the sprocket hole and the film strip upwardly until the registration pin substantially fills the sprocket hole, there being a sliding engagement between the upper edge of the rectangular shaft of the pin and the upper edge of the sprocket hole, sliding engagements between the two side edges of the shaft of the pin and the side edges of the sprocket hole and a very slight clearance, if any, between the lower edge of the shaft of the pin and the lower edge of the sprocket hole. If, prior to insertion of the registration pin into the left-hand sprocket hole, the framelet, film strip and sprocket hole are not precisely positioned on the X axis, one of the side faces of the truncated pyramid will engage a corresponding side edge of the sprocket hole to nudge the film strip into its correct location. However, it has been our experience that this X correction of the framelet position for plotting usually does not take place, inasmuch as the film tracks correctly with respect to the X axis.

The right-hand registration pin 122 shown in FIGS. 15, 16 and 18 functions in the same manner as the left-hand registration pin insofar as nudging along the Y axis is concerned. However, because of the generally correct positioning of the framelet with respect to the X axis, the sides of the registering pyramid at the rear end of the right-hand registering pin are cut away so that there will be no engagement between the sides of said pyramid and the sides of the sprocket hole. Hence, both registering pins provide the final nudging action for the framelet with respect to the Y axis, but only the left-hand registering pin will perform any nudging motion of the framelet with respect to the X axis.

In FIGS. 5 and 8 we have illustrated the registering pins in the plotting mode of the projector at which the pins extend through mating sprocket holes of the film strip. This is not the idle position of said pins inasmuch as the pins are biased rearwardly by the springs 122 to idle positions in which their tips clear the film strip.

Suitable means is included to shift the registration pins rearwardly into their then affiliated sprocket holes when the film strip has stopped its coarse movement in a position in which the center of the framelet at the plotting station is slightly below its correct final position. Said means comprises a pair of registration pin solenoids 134 (see FIGS. 2, 4 and 5). The springs 128 urge the solenoid plungers 138 and actuating heads 140 to an upward idle position. The head of each solenoid plunger engages a horizontal arm 142 of a corresponding bell crank hammer 144 the driving point of which rests against the head of the affiliated registration pin. The hammer is pivoted as at 146, so that when the solenoid 134 is actuated so as to drive down its head 140 against the action of the springs 128, 136 the hammer will rotate in a clockwise direction, as shown in FIG. 5, and will force the registration pin into the mating sprocket hole of the film strip. Deenergization of the solenoid will permit the spring 128 to lift the solenoid actuating head 140, and to disengage the registration pin from the film strip.

Despite the very small movement which the registration pin imparts to the film strip and framelet, the action of a solenoid is too rapid for precise repetitive positioning of the framelets without disfiguring the sprocket holes. Hence, such action is slowed down, as by the use of different dashpot 148 for each of the solenoids 134. As will be apparent from FIG. 5, the solenoids 134 and their associated dashpots 148 are mounted on the front face of the film track 68.

Attention is called to the fact that each registration pin has an associated momentary switch 150. Such switch includes an actuating element 152 that rests against the head of the registration pin and thereby senses the position of said pin. Said switch is included in a circuit, later to be described, for rendering the scribing stylus operative so that the stylus will not be shifted to scribing position until the registration pins previously are in mesh with the sprocket holes.

The projector also includes suitable means to turn the film transport motor 76 an amount proper to coarsely locate any selected framelet at the film gate. Said means may be manual or automatic. For example, the manual means may include a push button control circuit to bring any selected framelet up to a final plotting position through the use of a coarse drive, needing only the actuation of the registration pins to precisely locate such framelet in exact plotting position. Alternately, the means for energizing the motor may be automatic in nature, fed, for example as part of a predetermined program. We have shown herein, in FIGS. 19 and 20, a simple electrical circuit for controlling the motor 76 under the regulation of push buttons.

Referring to FIG. 19, the circuit includes a framelet selector 154 including a framelet select input 156 which comprises a group of push buttons (not shown), a different one for each framelet. It will be understood that, if desired, the framelet push buttons may be in the form of sets of tens and units push buttons to simplify operation. However, as shown herein, there is provided a different push button for each framelet. The framelet selector also includes a forward/reverse sensing means 158 and a start/stop sensing means 160.

The forward/reverse sensing means operates in response to the particular push button actuated by the operator. When the button actuated is higher than the framelet last at the plotting position the forward/reverse sensing means will send out an appropriate signal to a motor direct and start/stop control means 162 to determine the direction of rotation of the motor, so that the film strip will travel a minimum distance from the last framelet to the newly selected framelet. For example, if the framelet 2 is last in plotting position and the framelet 5 is newly selected, the film strip will be moved the shortest distance from 2 to 5 rather than, for instance, going from 2 to 1 and then from 1 to 5. The start/stop sensing means 160 controls a registration pin interlock means 164 which operates as a gating control for the motor direct and start/stop control means 162 to prevent operation of the means 162 if the registration pins are engaged in sprocket holes in the film strip.

The motor 76 drives the commutator switch 92 through the kinematic train shown in FIG. 3, this including the gear train 78, the Geneva drive 82 and the gear train 90 which jointly are indicated by the dotted line 166 in the circuit of FIG. 19. The film positioning circuit of FIG. 19 will, when any framelet button is actuated, energize the motor 76 to shift the film strip from the framelet then at plotting position to place the selected framelet approximately in plotting position, the placement being by means of a coarse drive and the framelet subsequently being finely exactly placed by the registration mechanism.

Moreover, the circuit of FIG. 19 performs an additional function, to wit, the circuit will, if the new framelet is on one side of the framelet already in position, move the strip directly from the old framelet to the new framelet; but if the new framelet is on the other side of the old framelet, the circuit will move the strip beyond the new framelet and then reverse the direction of coarse drive and shift the film strip back to the new framelet. The reason for this arrangement has already been discussed and, briefly, is to ensure that the approach of the strip by the coarse drive to the final position of the new framelet is always in the same direction of movement of the film strip. In the specific arrangement employed, when the coarse drive moves the strip from a lower numbered framelet to a higher numbered framelet the coarse drive will stop when the film strip coarsely positions the higher numbered framelet adjacent plotting position. However, when the new framelet is a lower numbered framelet than the old framelet, the coarse drive first will move the film strip from the old framelet beyond the newly selected framelet toward a framelet one lesser in number than the newly selected framelet and then the coarse drive will reverse to move the film strip to the newly selected framelet. Thus, the final coarse approach of the film strip to the plotting position of the newly selected framelet will always be in a direction from a lower numbered framelet to a higher numbered framelet.

In FIG. 20 there is illustrated an electrical circuit including the components of the forward reverse sensing means 158 and the start/stop sensing means 160, said components being connected to achieve the foregoing results. Said circuit, for simplicity, illustrates only the components for the second, third, fourth and fifth framelets, it being understood that the components for the remaining framelets are connected in a similar manner.

The circuit includes the commutator switch 92 four movable contacts $168_2$, $168_3$, $168_4$, and $168_5$ of which are shown. These contacts are carried by a rotary portion of the commutator switch, being driven through the train 166 by the motor 76. Said commutator contacts $168_2 \ldots _5$ move past and sequentially engage and disengage a stationary contact 170 which is connected to a positive DC voltage. For convenience of illustration, in FIG. 20 the movable contacts have been shown as stationary and the stationary contact as movable by the train 166.

Each of the movable contacts $168_2 \ldots _5$ is electrically connected to a different three pole switch $172_2$, $172_3$, $172_4$, and $172_5$. The switches are manually operable, e.g., by push buttons (not shown). The push buttons are mechanically interlocked in a well known manner so that only one switch at a time may be operated and operation (actuation) of any one switch will deactuate any switch which previously has been actuated. The push buttons that control said switches $172_2 \ldots _5$ constitute the framelet select input means 156 schematically indicated in FIG. 19. All of the switches $172_2 \ldots _5$ are "hold" switches, that is to say, switches which, unlike momentary switches, will, upon release, remain in the last position (actuated or deactuated) in which they were placed.

The contacts of the switches $172_2 \ldots _5$ are subdivided into single-pole single-throw sets arranged in a stop bank 174 and double-pole single-throw sets arranged in a forward/reverse bank 176. The set of contacts of each of said switches in the stop bank is open when the switch is de-actuated, that is to say, idle, this being the position in which the stop bank contacts are disposed when the control push button for the switch has not been depressed. The set of contacts of each of the switches in the forward/reverse bank is closed when the corresponding push button is idle, i.e., deactuated. The set of contacts of each switch in the stop bank is closed when the corresponding push button is actuated and the set of contacts of each switch in the forward/reverse bank is open when the corresponding push button is actuated. The set of contacts of each switch $172_2 \ldots _5$ in the stop bank 174 is series interposed in a direct wire circuit running from the corresponding commutator contact $168_2 \ldots _5$ to a common run/stop bus 178 that leads to the actuating coil 180 of a run/stop relay 182 which constitutes the start/stop sensing means 160 of FIG. 19. Series interposed in the bus 178 immediately adjacent the relay 182 are the normally open contacts of the film drive stop momentary switch 120 (see also FIG. 3).

Each set of double-pole single-throw contacts of the switches $172_2 \ldots _5$ in the forward/reverse bank 176 has its blades connected in common by a direct wire circuit to the corresponding commutator contact $168_2 \ldots _5$. Their stationary contacts are connected in tandem by leads 184. Their endmost stationary contacts are engaged by forward and reverse leads 186, 188 to the control coil of a forward/reverse latching control relay 190.

Said relay has a permanent ground connection 192 for control and power output circuits and is supplied with positive DC voltage for power output from a terminal 194 through a normally closed pair of contacts 196 of the run/stop relay 182. The relay 190 has a pair of DC power output leads 198, 200 that run to the power terminals of the reversible DC motor 76.

The relay 182 additionally controls a single-pole double-throw pair of contacts constituting a movable blade 202 connected to a positive DC voltage source and shiftable under the control of the coil 182 between a stationary contact 204 which it engages when the relay 182 is idle, and a second stationary contact 206 which it engages when the relay 182 is energized. The contact 204 has a lead connecting it to a pressure pad solenoid 208 (see FIG. 11). The other stationery contact 206 has a lead connecting it to the registration pin solenoids 134.

The circuit of FIGS. 19 and 20 provides an arrangement that secures selected access to any of many framelets controlled thereby. In operation, the commutator switch 92 senses the existing framelet position, i.e., the framelet which is at the film gate. The framelet selector circuit senses whether the number of the commutator position is greater than, less than or equal to the number of the new framelet selected. If the new framelet selected is the same as the last framelet in position at the film gate, the motor 76 will remain stopped. If the new framelet selected has a number less than the framelet last at the film gate, the motor will drive the film strip and the commutator switch backwards. If the new framelet selected has a number greater than the framelet last at the film gate, the motor will drive the film strip and the commutator switch forward. The registration pin interlock 164 makes certain that the pins have been withdrawn from engagement with sprocket holes of the film strip before the film strip is moved.

As an example of the operation of the circuit, let it be assumed that, as shown in FIG. 20, the framelet last at the film gate was framelet No. 3. Hence, the stationary contact 170 will be in engagement with the movable (but now quiescent) commutator contact $168_3$. Now assume that, as shown in said figure, the push button for framelet No. 5 is depressed. This will close the single-pole set of contacts of the switch $172_5$ in the stop bank 174 and will open the set of double-pole contacts of the same switch in the forward/reverse bank 176. Due to the opening of the set of double-pole contacts in the forward/reverse bank of the switch $172_5$, positive DC voltage flowing from the stationary commutator contact 170 cannot place positive potential on the reverse lead 188. Positive voltage only will be transmitted through the file connection to the forward lead 186. At this time (the push button depressed and the motor 76 at rest) the film drive stop switch 120 is in its closed position inasmuch as the input element 80 of the Geneva drive had last stopped the motor 76 in a position in which the lobe 118 of the cam 116 had mechanically operated the switch 120 to leave its contacts open. However, there is no power on the bus 178 since the contact 170 is on the contact $168_3$ that is now unconnected to said bus. Thus, the run/stop relay 182 is idle and the contacts 196 are closed, so that positive DC potential for power output is available for supply to the control circuit of the forward/reverse control latching relay 190. The actuation of the relay 190 upon application of positive DC potential to the forward lead 186 is in a forward mode (the reverse lead 188 having no voltage thereon) and this will supply positive potential to the motor lead 198 and ground to the motor lead 200. These polarities will cause the motor 76 to start running in a forward sense. As the motor turns it advances the film strip framelet by framelet and at the same time advances the movable commutator contacts, contact by contact. As the film strip and motor advance, the positive contact 170 will engage one after another of the commutator contacts $168_4$, $168_5$. It will be noted that the relay 190 does not deactuate the motor leads as the stationary contact 170 is disengaged by successive movable commutator contacts, since the relay 190 is a latching relay (will remain in its last energized position) and hence, continues to supply power in a forward mode from the terminals 192, 194 to the motor. Ultimately, the commutator switch and the film strip reach commutator contact $168_5$ and framelet No. 5. As this occurs, positive potential is applied to the common bus 178 through the closed (actuated) set of single-pole contacts of the switch $172_5$, preparing the run/stop relay 182 for operation. As soon as in the framelet-to-framelet movement cycle of the film strip the film drive stop switch is operated by the lobe 118 to close the contacts 120, the normally closed contacts 196 will open, removing power from the motor lead 198 and thereby stopping the motor 76. The stationary contact 170 will remain engaged with the commutator contact $168_5$ and, since the push button for framelet No. 5 is engaged, the set of single-pole contacts of the switch $172_5$ will remain closed while the set of double-pole contacts of the same switch will remain open. The contacts 196 remain open until a new framelet button is depressed to remove voltage from the bus 178.

As a further example of the working of the film transport mechanism, consider what takes place when the No. 3 framelet button is depressed when the No. 5 framelet was the last one in position at the film gate. At this time the stationary commutator contact 170 is on the movable commutator contact $168_5$. The set of single-pole contacts of the same switch are open, since the push button for framelet No. 3 has been depressed, also causing the push button for framelet No. 5 to be released. Positive voltage derived from the stationary commutator contact 170 will appear on the reverse lead 188, but not on the forward lead 186, since the file of connections through the sets of double-pole contacts of the switches $172_2 \ldots _5$ is broken at the set of double-pole contacts of the switch $172_3$. Hence, the forward/reverse latching control relay 190 will be actuated in a reverse mode. This will supply positive potential to the lead 200 and connect the lead 198 to ground, whereby the motor 76 will be started up and run in reverse.

It will be recalled that positive DC voltage is supplied to the said lead 200 through the contacts 196 since these are closed, inasmuch as at the moment the push button for the newly selected framelet No. 3 has been depressed the relay 182 is idle because there is no positive DC potential on the bus 178. The film strip will be driven in a reverse direction and the commutator driven to contact No. 4 where the same conditions exist as on contact No. 5 (no power on the bus 178 because No. 4 push button is idle). Then the motor continues to drive the film strip and the commutator from No. 4 to No. 3 position inasmuch as the motor still is driving in reverse. Since the bus 178 now is energized there will be positive potential applied to the run/stop relay 182 when the switch 120 closes. However, there is no ground on the other side of the relay, inasmuch as the other side of said relay is connected to the output lead 200 which, with the relay 190 actuated in reverse mode, it will be recalled, is supplied with positive DC potential. Therefore, the relay 182 does not energize and the contacts 196 remain closed, so that the motor continues to drive in reverse from commutator contact $168_3$ to commutator contact $168_2$. During this last movement of the motor there is no voltage on either the forward or the reverse lead 186, 188 since the set of double-pole contacts of the switch $172_3$ are open; but because the relay 190 is a latching relay the motor will continue to be driven reversely. Next, the motor drives the film strip and the commutator switch to framelet position No. 2. This will place positive DC voltage on the forward line 186, but no voltage on the reverse line 188. Moreover, there is no voltage at this moment on the run/stop common bus 178. Therefore, the motor stops and instantly restarts in a forward direction from framelet position No. 2 and commutator switch position No. 2 to the corresponding No. 3 positions. Thus, the commutator and the film strip are moved from position No. 2 to position No. 3. During this last direction of movement the same train of events occur as during the movement from position No. 3 to position No. 5 previously described, so that the motor comes to a halt at selected position No. 3.

As the film moves from framelet to framelet the registration pins 122 are in their foremost position with their tips disengaged from the film strip. But as soon as the film stops upon energization of the relay 182 the registration pin solenoids 134 are energized via the blade 202 and contact 206 to inch the selected framelet into its exact plotting, i.e., display position.

The film track 68 has, as previously mentioned, an aperture constituting a film gate 71 at the plotting station 70. The film gate is more specifically defined by an apertured mask 210 (FIGS. 5 and 8) set into the plotting station. Supported on the rear face of the mask 210 is a backup plate 212 of transparent material, for example, glass. The back surface of the backup plate is plane and vertical and perpendicular to the optical axis of the projection system. Hence, it provides a rigid support for the framelet at the plotting station to ensure that the framelet is plane during display and scribing. The upper and lower edges of the backup plate preferably are chamfered to ease movement of the film strip in either a forward or a reverse direction.

The film strip is flexible to enable it to be transported in the manner hereinabove described. This is not conducive to precise scribing and display accuracy and, therefore, the framelet of film strip at the plotting station must be effectively rigidified at such times as it is stationary for scribing or display. This is in part accomplished by the backup plate 212. To hold a film strip against the backup plate, we further provide a pressure pad 214. The pressure pad is located behind the film strip at the plotting station and is formed with a large central aperture of a size greater than and concentric with the aperture in the mask to ensure that the entire framelet will be illuminated and also to provide ample room for scribing on the rear surface of the film strip. The pressure pad is of rigid material such, for instance, as metal, and has a plane front face. Suitable means is included to retract the pressure pad at such time as the film strip is transported in a forward or reverse direction and to resiliently bias the pressure pad against the rear face of the film strip at the plotting station when it is desired to perform scribing and/or display operation on a stationary framelet.

As shown herein, the means for mounting and forwardly biasing the pressure pad constitutes a pair of flanges 216 (FIGS. 8 and 11) extending forwardly from both vertical side edges of the pressure pad. The flanges are horizontally slotted adjacent their upper and lower ends to receive pins 218 carried by a stationary part of the film track 68. Thereby, the pressure pad is effectively guided for movement horizontally in a front-to-back direction. Such movement need not be a precise one, inasmuch as the opening in the pressure pad is sufficiently oversized to prevent any obstruction of the framelet at the plotting station.

In order to shift the pressure pad forwardly or rearwardly, as the case may be, we include a pair of actuating arms 220 (see also FIG. 10) one at each side of the film track, in the general vicinity of the plotting station. The upper end of each arm includes an inwardly extending pin 222 which pivotally engages the associated flange 216 intermediate the slots that slidably receive the pins 218. Said actuating arms are pivoted on bolts 224 to the opposite sides of the film track 68. The lower ends of said arms are interconnected by a pressure plate bar 226, so that the arms can be rocked in common about their pivotal bolts 224. The ends of the bar 226 are rotatably connected to said arms 220. Thus by shifting the bar 226 in a forward or reverse direction (see FIG. 11), the pressure pad 214 will be shifted in the opposite direction.

For the purpose of shifting the bar 226, we have provided the pressure pad solenoid 208, the actuating element 228 of which is attached to a midpoint on the pressure plate bar 226. The solenoid includes an internal spring 230 which, when the solenoid is idle, biases the pressure plate bar 226 rearwardly so as to resiliently urge the pressure pad 214 forwardly against the rear surface of the film strip and to compressively sandwich the film between it and the backup plate 212 (with the selected framelet rearwardly exposed). When the solenoid 230 is energized, as it will be when the run/stop relay 182 is idle (see FIG. 20) and the motor 160 running, the actuating coil of the solenoid 208 will override the spring 230 and hold the pressure pad out of engagement with the film strip to permit free movement of the film strip in either a forward or reverse direction, as the case may be. The upper and lower forward edges of the presure pad are chamfered (see FIG. 5) to prevent interference with forward or reverse movement of the film strip.

To further control X and Z positioning of the film strip at the plotting station, we rely upon the backup plates 130 the rear flanges of which are spaced slightly rearwardly from the back face of the film track (see FIG. 8) to define narrow spaces for movement of the edges of the film strip therethrough. The surfaces defining the side faces of these spaces are distant from one another very slightly more than the width of the film strip, the spacing being such as to permit free forward and reverse movement of the film strip without binding, but tending to maintain the film strip in its proper X position so that they relieve the need for extensive X shifting of the film strip by the registration pins. The front-to-back dimensions of said spaces is just enough thicker than the film strip to permit free movement of the strip therethrough.

Figure 9:
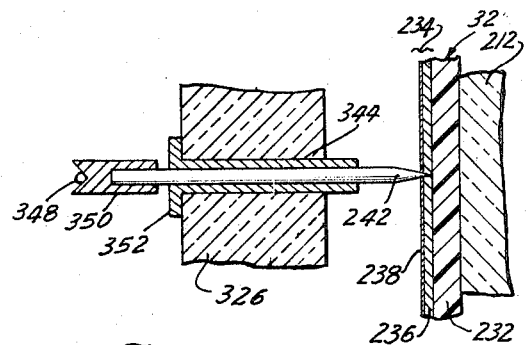
FIG. 9 is a highly enlarged sectional view taken substantially along the line 9—9 of FIG. 6 and illustrating the stylus, the stylus support and the stylus biasing means.
Figure 10:
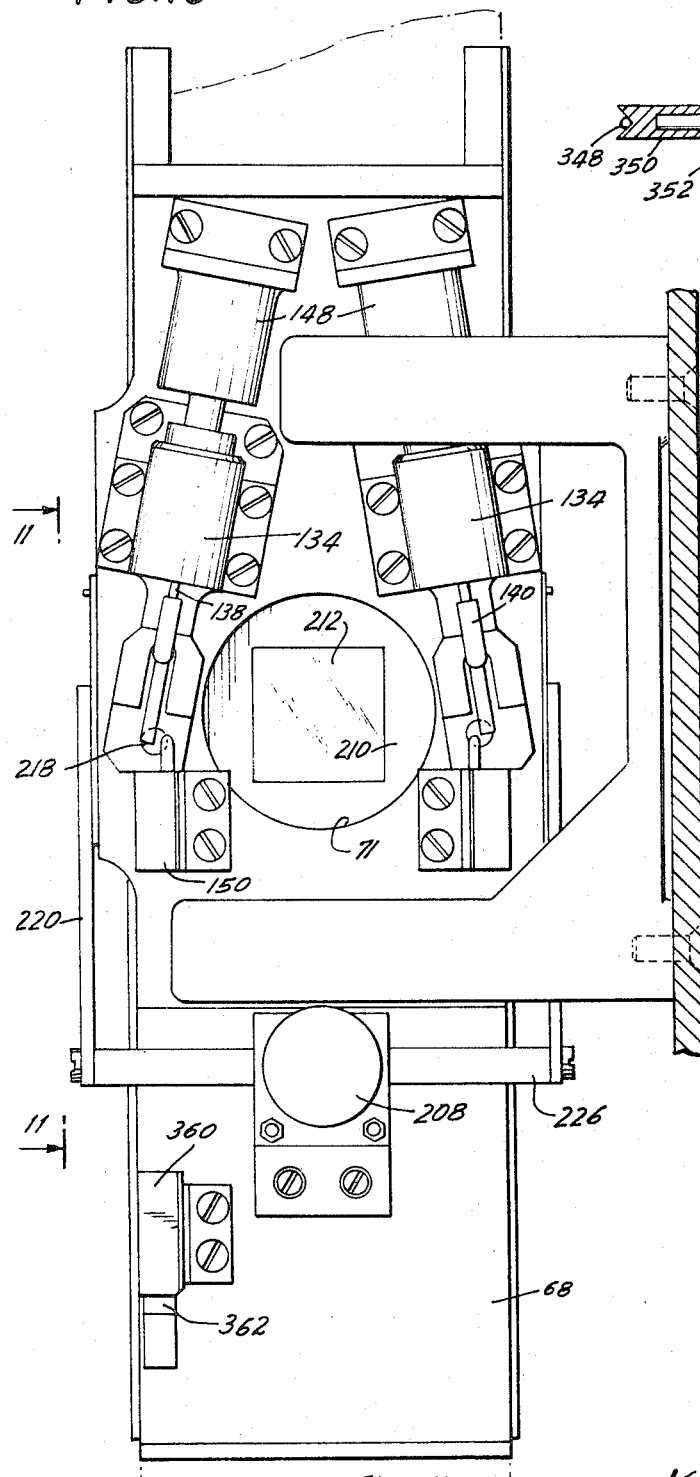
FIG. 10 is a sectional view taken substantially along the line 10—10 of FIG. 5 and illustrating the front side of the plotting station, that is to say, the side of said station facing the projection lens.
Figure 11:
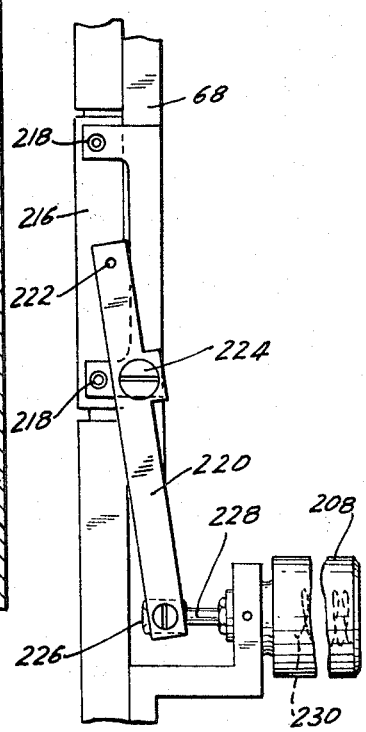
FIG. 11 is a fragmentary sectional view taken substantially along the line 11—11 of FIG. 10, and illustrating the mechanism for shifting the pressure pad into and out of engagement with the back of a framelet at the plotting station.

The film strip 32 constitutes a transparent flexible support 232 (FIG. 9) on the rear surface of which is provided an opaque scribable coating 234, the support being less readily scribable than the coating, i.e., harder than said coating. Most desirably the support has good dimensional stability. A typical satisfactory support is a thin "Mylar" sheet, to wit, a polyester sheet. An excellent opaque scribable coating for the rear surface of the support is a two-layer coating, the forward layer 236, which is against the polyester support, being a pigmented organic resinous coating. The rear layer 238 is an extremely thin film of metal, for example, aluminum, gold or silver, a few (two to five) microns thick. Typically, the film may be deposited by vacuum evaporation. The metal film is just thick enough to be opaque and to inhibit the presence of pinholes.

The combination of the metal film and the pigmentation of the forward layer acts to prevent passage of light therethrough where the scribable coating 234 is intact. However, where lines have been scribed through the coating 234, light will pass through the support 232 to be projected onto a screen. The composite character of the scribable coating results in excellent definition of the projected image, inasmuch as the very thin opaque metal film will sharply delineate the sides of a scribed line while the thicker, although yet still thin (for example, a thousandth of an inch), forward layer 236, which likewise will be scribed together with the metal film forms a channel through which the light rays will be directed to a screen.

An extremely efficient fast acting and accurate scribing assembly 240 (FIGS. 2, 5, 6, 7 and 8) is provided as a part of our film strip dynamic plotting projector. Said assembly is characterized by the lightness and simplicity of its parts, the absence of free play, and a low Z inertia and high Z compliance of the scribing stylus and the parts functionally integral threwith on the Z axis. The scribing assembly is composed of a stylus 242 (see FIG. 9) and means to mount the stylus for movement in X, Y and Z directions, together with means to shift the stylus in such directions.

The means mounting the stylus for movement in an X direction includes a hollow frame constituting an X carriage 244 (see FIGS. 2, 5, 6 and 7). The upper end of the X carriage is arranged to slide along a stationary transverse horizontal shaft 246 so that in effect the X carriage hangs from and rides along the shaft. To minimize friction between the shaft and the carriage we provide on the carriage a pair of ball bushings 248 (see FIG. 6) which are of conventional construction. These are ball bushings with recirculating lightly compressed balls such, for example, as the series "Inst" instrument ball bushings, manufactured by Thomson Industries, Inc., of Manhasset, N.Y. The two ball bushings are precisely aligned and thereby guide movement of the X carriage in a horizontal direction, perpendicular to the optical axis, along the X shaft 246, the ends of which are fixed to stationary parts of the projector frame. To prevent the lower end of the X carriage 244 from rocking, the bottom of the carriage includes a pendant pin 250 which makes a close sliding fit with a horizontal slot 252 parallel to the shaft 246 in a stationary portion of the projector frame below the X carriage.

The means mounting the stylus for movement in a Y direction includes a hollow frame constituting a Y carriage 254. The Y carriage is guided for movement in a Y direction by a vertical shaft 256 at one side of the Y carriage and having its opposite ends fixed to the X carriage which is positioned behind it. The shaft 256 slidably passes through vertical bores in the Y carriage and friction is minimized, as in the case of movement between the X carriage and its shaft 246, by the use of ball bushings 258 carried by the Y carriage in said bores. Hence, the X carriage 244, together with the Y shaft 256, is freely movable on the shaft 246 in an X direction and the Y carriage is freely movable on the shaft 256 in a Y direction, the Y carriage additionally moving with the X carriage in an X direction. Mounting of the Y carriage solely by the shaft 256 would permit rocking movement of the Y carriage with respect to the X carriage about the axis constituted by the shaft 256. This is prevented by a guide pin 260 extending from the side of the Y carriage opposite to that at which the ball bushings 258 are located. The guide pin 260 rides in a vertical slot 262 formed in a plate 264 fixed to a side of the X carriage and extending forwardly therefrom.

There is no tendency for the X carrigae to drift either to the right or to the left when the projector is mounted on a horizontal base with the X shaft 246 horizontal. However, the force of gravity acts upon the Y carriage 254 and all parts carried thereby. Hence, there will be a tendency for the Y carriage to move downwardly under the influence of gravity. Since this tendency can affect the accuracy and positioning of the Y carriage, counterbalancing means preferably is included to substantially equally oppose the force of gravity, acting on, i.e., weight of, the Y carriage and parts carried thereby. Such counterbalancing means conveniently is in the form of a linear antigravity spring 266. This is a close pitch helical wire spring which exerts a substantially uniform restoring (straightening) force when the same is flexed about an axis perpendicular to its length and within a predetermined range of movement. Such springs are manufactured by the Hunter Spring Company and are known as "Flexator" springs. The spring 266 is so selected and positioned that, within the range of movement of the Y carriage relative to the X carriage, it will exert a substantially constant effort restoring force substantanially equal to the weight of the Y carriage and the parts carried thereby. The ends of the spring are anchored respectively on a pin 268 on the Y carriage and on a pin 269 on the plate 264 and, therefore, functionally unitary with the X carriage.

An X positioning (traversing) torque motor 270 is provided to drive the X carriage 244 to the left or to the right in an X direction under selective control. The input of the motor 270 can be supplied in the form of a digital input or an analog input or a manually controlled input, and can be taken, if desired, from a memory bank or from a computer or from a hand operated potentiometer, depending upon the use to which the projector 30 is to be put or on its mode of control. As is usual, a servo followup is provided including a follower element 272 (see FIG. 4) and a trimmer resistor 274 to ensure that the motor stops when the X carriage is in a position corresponding to some given input. A similar Y positioning torque motor 276 together with a follower element 278 and trimmer resistor (not shown) are included to controllably shift the Y carriage upwardly or downwardly in a vertical direction. As in the case of the X torque motor, the inputs to the Y torque motor can be digital, analog, or manually controlled.

A unique kinematic transmission is provided to connect the X positioning motor 270 to the X carriage 244, the transmission being such that the X carriage is traversed with great precision and extreme accuracy of repeatability. Said kinematic transmission has the further virtue of being simple to make, and easy to install and adjust.

In particular, the kinematic transmission we employ to connect the X positioning motor to the X carriage (a similar transmission is used between the Y motor and the Y carriage) is a single flexible metal ended (as distinguished from endless) drive belt 282 of unusual configuration. Preferably, the belt is made from a metal having a low coefficient of heat expansion. The belt is thin so as to enhance its flexibility and is roughly in the shape of a tuning fork with a connection between the ends of the parallel tines. The shape also might be described as that of a wishbone with the tips of the legs interconnected.

The foregoing configuration is best seen in FIG. 2 where it will be appreciated that the belt is in the form of a straight narrow central shank 284 of uniform width and having a cross head 286. The foot of the shank opposite to the head is unitary with a cross member 288 from the opposite ends of which parallel sraight legs of uniform width 290 extend. The other ends of the legs are integrally interconnected by a terminal cross bar 292. The legs 290 are of equal width which preferably is the same as the width of the shank 284, although this is not critical. The space between the legs 290 is slightly in excess of the width of the shank 284. The belt includes a circular loop 294 intermediate its ends, so arranged that the shank 284 passes through the slot 296 between the legs 290. The balance of the shank 284 and of the legs 290 lie in a common horizontal plane.

The output shaft of the X torque motor 270 extends through the loop 294 and the belt is fast to said output shaft as by bolts 298 (see FIG. 6) which pass through openings in the cross member 288 and engage said output shaft. The ends of the belt 282 are made fast to the opposite ends of the top of the X carriage 244, as by bolts 300 which pass through the cross head 286 and the terminal cross bar 292.

The belt is maintained under longitudinal tension, any suitable arrangement being used for this purpose. As shown, the tensioning is obtained by having the belt adjacent one end thereof bridge a front to back groove 302 in the top of the X carriage 254. The belt is selectively forced in to the groove by a tapered plug 304 and a bolt 306. Tightening the bolt 306 increases the tension in the belt.

It thus will be seen that when the X torque motor 270 rotates in either direction, the loop 294 will remain in a fixed spatial position but will, however, rotate so as to reduce the distance between the loop and one end of the belt and increase the distance between the loop and the opposite end of the belt, thereby shifting the X carriage in an X direction. Since the loop is fast to the output shaft of the X torque motor and since the belt is under tension for its entire length, there will be no lost motion or play between the X torque motor and the X carriage. By having the shank 284 pass through the slot 296 and by providing the loop 294, we are able to effect the kinematic transmission with the use of a single ended belt, thus preventing any relative motion between two or more belts such as have heretofore been employed for interconnecting a traversing motor with one of the carriages of a scribing assembly.

As noted above, a similar kinematic transmission is used to connect the Y torque motor 176 to the Y carriage 254. This latter kinematic transmission includes a wishbone belt 310 constituting a flexible metal strip of the same configuration as the belt 282 and including a similar shank passing through the slot between a pair of legs and further including an intermediate circular loop. The loop receives the output shaft of the Y traversing motor 276 and is made fast thereto as by bolts 312. Because the Y traversing motor is mounted on a stationary support (the projector frame) and the Y carriage is traversed in an X direction with the Y carriage, it is not possible to connect the ends of the wishbone belt 310 directly to the Y carriage. Therefore, intermediate elements must be interposed to allow the Y carriage to shift in an X direction relative to the Y traversing motor 276. Said intermediate elements constitute a horizontal shaft 314 parallel to the shaft 246 but fast to the Y carriage. Said shaft is disposed at the bottom of the Y carriage. Slidable along the shaft is the upper end of a vertical pendent traversing leg 316. To minimize friction, said upper end is provided with a ball bushing 318 that engages the shaft 314. One end of the wishbone belt 310 is made fast to one vertical side surface of the leg 316 and the other end of the belt is made fast to the opposite vertical side surface of said leg, as with the use of nuts and bolts 319. The belt 310 is tensioned by a block 320 and bolt 322, said belt being trained around the block, so that when the bolt 322 is tightened, the block will be forced downwardly to increase the tension in the belt.

The block is guided for movement parallel to the length of the leg 316 by a foot thereon which is slidable in a slot in the lower end of the leg.

It will be apparent that when the output shaft of the Y torque motor 276 is turned, it will alter the position of the circular loop thereon with respect to the ends of the belt (although the center of the loop is stationary), in effect one end of the belt moving closer toward the output shaft of the said motor and the other moving closer to the loop, the distance being measured along the length of the belt. Such movement of the belt will raise or lower the vertical traversing leg 316 regardless of the position of the Y carriage relative to the X carriage in an X direction, since the Y carriage is free to move in an X direction relative to the leg 316 by virtue of the interaction between the shaft 314 and the ball bushing 318. It will be appreciated that, as previously mentioned, it takes approximately the same effort of the Y traversing motor 276 to raise or to lower the Y carriage due to the counterbalancing effect of the constant effort spring 266.

The means for mounting the stylus on the Y carriage 254 for movement thereof in a generally Z direction includes a stylus plate 326 (see FIGS. 2, 5, 6, 8 and 9) of transparent material, this being necessarily so since light must pass therethrough from the lamp 40. Accordingly, said plate desirably is made from glass with a good index of light transmission. The lower edge of the stylus plate 326 is pivotally connected to the lower edge of the frame of the Y carriage so as to permit turning movement of the plate relative to the carriage about a Y oriented axis. The plate 326, however, is substantially vertical so that the aforesaid rotational movement is translated into a substantially Z oriented movement of the center of the plate where the stylus is located. To minimize friction hysteresis of the pivotal mount of the stylus plate on the Y carriage, we orthogonally connect the plate to the carriage by means of an elongated flat spring 328 (see FIG. 5) which is sited with its plane vertical. The spring is positioned below the bottom edge of the stylus plate. The upper edge of the spring is integrated with a U-clip 330 which grips the bottom edge of the stylus plate. The lower edge of the spring is secured to the bottom portion of the Y carriage by a clamp 332. However, the spring is free to flex about a Y oriented axis running parallel to the length of the spring, so that the stylus plate can rock about this axis to perform Z movement of the stylus.

We provide a Z shifting solenoid to effect movement of the stylus plate about the aforesaid pivotal axis and thus to achieve a Z motion of the stylus. Said solenoid 334 (see FIGS. 5 and 21) is secured to a bracket 336 which is fast to the top of the Y carriage 254. An internal spring 338 biases the solenoid plunger 340 rearwardly when the solenoid is idle. The solenoid is strong enough to overcome the action of the spring and drive its plunger forwardly when the solenoid is energized. Said solenoid plunger is secured to the tip of a stylus plate actuating arm 342 that is rigidly secured to the top edge of the stylus plate and therefore movable therewith. Hence, when the solenoid is actuated, it will rock the stylus plate forwardly and when deactuated it will permit this spring to rock the stylus plate rearwardly. In the rearward position of the stylus plate the tip of the stylus is out of contact with the back surface of the film strip at the plotting station. In the actuated position of the Z shifting solenoid 334 the tip of the stylus is in scribing engagement with the back surface of the film strip.

The stylus 242 constitutes a slender spindle (see FIG. 9) the forward end of which is tapered to an almost sharp tip, said tip having a very tiny radius of curvature, for example, in the order of one-half a thousandth of an inch. The shank of the stylus is received in a precision sliding fit in a stylus bushing 344 that extends through and is rigidly secured to, as by cement, the stylus plate 326. The stylus bushing and stylus itself are perpendicular to the stylus plate, and preferably are located at approximately the center of the plate. Said bushing and stylus are so positioned on the stylus plate that when the Z shifting solenoid is actuated and the stylus plate rocked to its foremost position the stylus is perpendicular to the backup plate 212 and therefore perpendicular to the framelet at the plotting station.

Since, despite all precautions taken, the back surface of the film strip at the plotting station cannot be absolutely flat, and furthermore, since the inertial momentum at the time of initial engagement between the tip of the stylus and the film strip must not be too great so as to raise the possibility of puncturing or indenting the support layer of the film strip when the stylus is abruptly stopped in its Z movement, we provide means for biasing the stylus forwardly, thereby permitting the stylus to shift rearwardly against such bias near the end of the forward movement of the stylus plate when the solenoid 334 is actuated. The biasing means should, because a film strip is being employed as the plotting medium, have a high Z compliance and a low Z inertia.

We obtain the foregoing desirable result through the use of a special biasing means. Said biasing means includes a pair of rearwardly extending flat cantilever spring supports 346 mounted on opposite sides of the stylus plate as with the use of U-clips (see FIG. 8). Stretched between these supports is a fine wire 348. The center of the wire engages a groove at the rear end of the stylus 242. The tension under which the wire 348 is maintained between its supports 346 is such that when the stylus is out of engagement with the rear surface of the opaque scribable coating 234, the forward end of the head 350 rests lightly against a flange 352 formed at the rear end of the bushing 344 and in contact with the rear surface of the stylus plate.

When the stylus plate is brought forward by energization of the Z shifting solenoid 334, the tip of the stylus first will engage the rear surface of the film strip lightly and then as the stylus plate is brought to its foremost position with the stylus plate parallel to the film strip, the supports 346 will deflect inwardly and the wire 348 will bow rearwardly. The increased Z pressure thereby imparted to the stylus is designed to be mild, so that the stylus will not puncture or indent the support 232. It will be seen that the Z inertia of the stylus thereby is kept very small. It is a function only of the mass of the stylus 242 and the head 350. However, with this small Z inertia we have combined a high degree of Z compliance, by use of the bowed wire 348 stretched between the cantilever supports 346. Thereby, when the stylus is in scribing engagement with the film strip and is rapidly moved by action of the X and Y traversing motors, the stylus can readily shift in a Z direction to ride over any irregularities that may be present in the back surface of the film strip and will not leave furrows in the rear surface of the support 232.

Attention is directed to the fact that the Z inertia of the stylus is kept particularly low by permiting relative motion in a Z direction between the stylus 242 and the stylus plate 326 and yet the stylus plate exerts a high precision control over the X and Y movement of the stylus due to the close sliding fit between the stylus bushing 344 and said stylus.

It will be apparent that when the film strip 32 is stationary and in its exact final plotting position and held flat against the backup plate by the pressure pad, actuation of the X and/or Y traversing motors will cause the stylus to trace out a graphic symbol 354 of some preselected contour in the framelet then at the plotting station.

The stylus control circuit, that is to say, the circuit which moves the stylus 242 into or out of plot, is illustrated in FIG. 21. The Z shifting solenoid 334 is arranged to be energized from a positive voltage DC terminal 356 to a ground 358. The energizing circuit has series connected therein a film sensing interlock switch 360 (see also FIGS. 2 and 5) and the film registration interlock switch 150. The actuating element 362 for the switch 360 bears against the front surface of the film strip in the film track 68. The switch 360 has normally closed contacts which open when the actuating element 362 springs rearwardly in the absence of the film strip in the film track. The film registration interlock switches 150 already have been described, these being the switches which have actuating elements engaged against the forward ends of the registration pins 122. The contacts of the switch 150 in the stylus control circuit are open when the registration pins are in their foremost position and closed when the registration pins extend through sprocket holes in the film strip. Thereby, the solenoid 334 cannot be actuated to bring the stylus into plotting position unless the film strip is present at the plotting station and unless the framelet at the plotting station has been brought to its final exact plotting position by means of the inching registration pins 122. The energizing circuit for the Z shifting solenoid 334 also includes a pair of normally open contacts 364 designed to be closed upon depression of a plot punch button 366. When this push button is depressed the Z shifting solenoid 334 will be actuated to bring the stylus into plotting position, providing that there is film at the film gate and further providing that the film is in its correct plotting position.

As the scribing assembly, through the movement of the X and Y carriages traverses the stylus across the back of the film strip in various directions including X and/or Y components, and the stylus scrapes a line through the opaque scribable coating 234, scraps and shavings of said coating will fall from the film strip. Desirably, these scraps and shavings are withdrawn from the plotting station so as to keep said station free of debris that might interfere with brilliant display. This is accomplished by blowing and suction means, the blowing means additionally functioning to cool the film strip so as to prevent heat distortion and inhibit buckling at the plotting station.

The blowing means constitutes a pair of nozzles 368 (see FIG. 6) passing through and carried by the stylus plate actuating arm 342 at the upper edge of the stylus plate. Said nozzles are oriented to converge the air streams which issue therefrom downwardly toward the general region of the scribing stylus 242. The nozzles have their tips located slightly forwardly of the front face the stylus plate 326. The air plays across the front of the plate and around the tip of the stylus. This serves to keep the film cool and to sweep scraps and shavings downwardly out of the area of the plot. Compressed air at approximately ambient temperature is supplied to the nozzles from flexible conduits 370, thus permitting the stylus plate to move in X, Y and Z directions without hindrance.

To further assist in removal of debris falling from the opaque scribable coating, a large suction nozzle 372 is located below the scribing plate and connected to a source of suction by a pipe 374. Because the suction nozzle has a large mouth, it is mounted on the vertical pendant traversing leg 316.

The motor 76, the commutator switch 92, the film drive switch 120 and the trains interconnecting the same are all housed in a box 376 mounted on the base of the projector. Furthermore, for optional hand control of the position of the film strip, we include a manually rotatable wheel 378 which is attached to the gear 78 in said box 376.

The filter bank 46 is so constructed as to enable any one of a group of differently colored filters to be shifted from a normally idle position in which they are offset from the optical axis of the projection lens to an actuated position in which they are in line with said optical axis. Several color filters are independently mounted on a filter frame 380 which is attached to the frame of the projector. Inasmuch as all of the filter mountings are the same, only one will be described, this being best illustrated in FIG. 12. Any given filter 382 is composed of a hoop 384 in which a colored filter pane 386 is secured. The hoop is rigidly attached to one end of a filter arm 388 that is pivotally mounted on a shaft 390 which is common to all of the filters 382. The shaft 390 is parallel to the optical axis of the projection lens, but displaced therefrom and so located with respect to the proportions of the arms 388 that the sundry filter panes 386 can be swung to intercept the axis of the projection lens. To make more uniform the effect required to move the filters 382 in opposite directions, each filter has associated therewith a different anti-gravity spring 392, similar to the spring 266 which will exert a constant force upward bias that in the absence of any other force except the weight of the filter and its movement will hold the filter 382 in its uppermost idle position illustrated by full lines in FIG. 12. The operative position of the filter is illustrated by dot and dash lines in the same figure.

To shift a filter to its operative position, we provide a solenoid 394 (a different one for each different filter 382). The actuating element 396 of the solenoid is pivotally connected by a pin 398 to the filter arm 388. The solenoid illustrated in FIG. 12 is located above the shaft 390 and the actuating element 396 for the solenoid is connected to the arm on the opposite side of the shaft 390 from the hoop 384. When the solenoid is actuated, it will pull the element 396 upwardly and displace the filter pane downwardly into its actuated operative position. Alternate filter panes have solenoids located beneath the shaft 396 and the actuating elements therefor are connected to pins 400 disposed on the same side of the shaft 390 as the hoops 384, whereby energization of the lower solenoids will forcefully lower the associated hoops into their actuated positions. Each solenoid includes an internal compression spring 402 which biases the actuating element 396 associated therewith into its idle position.

Suitable circuitry (not shown) connects the individual solenoids 394 to color control switches (not shown). When any one or more switches are operated, it (or they) will energize its associated solenoid. This will pull the associated color filter in line with the optical axis of the projection lens simultaneously as the last operated switches are thrown to idle position so that there will be a direct change from any previous color to the next selected color without the interposition of unwanted colors between the last and the selected color.

The operation of the projector 30 is quite simple. The film strip is threaded through the film gate, is trained about the upper and lower drive sprockets 64, 72 and has its ends connected to the hollow hubs of the upper and lower spools 50, 52. To select any given framelet, the proper push button is actuated which will cause the motor 76 to move the film strip in intermittent steps to the selected framelet, whereupon the motor will cut itself off. The approach of the selected framelet to its final coarse position will always be in the same direction. Such coarse positioning of the film strip is then followed by an inching fine positioning through operation of the registration pins 122 which automatically are brought into play when the motor stops. As the film strip is moved, the registration pins are forwardly displaced from the sprocket holes and the pressure pad 214 is displaced rearwardly out of engagement with the film strip. However, as soon as the motor stops, the registration pins engage the sprocket holes and the pressure plate is biased against the rear face of the film strip. Thereafter, when desired, the plot push button 366 is actuated which will cause the stylus to be shifted forwardly into plotting position. Finally, inputs are fed into the X and Y traversing motors, causing the scribers to be moved in any selected combination of X and Y directions.

It thus will be seen that we have provided a projector which achieves the several objects of our invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

We claim:

1. A dynamic plotting projector for information display, said projector constituting a film track having a plotting station and a film gate aligned therewith, a film strip comprising a flexible transparent support with an opaque scribable coating thereon, means to intermittently move the film longitudinally with respect to the plotting station so as to locate any desired framelet of said strip at said station, a scribing stylus at the plotting station on the same side of the strip as the scribable coating and generally perpendicular thereto, a stationary transparent backup plate at the plotting station on the side of said strip opposite to the stylus, the surface of said plate facing the film strip being plane and uninterrupted, a pressure pad at the plotting station on the same side of the film strip as the stylus, said pad constituting a member with a plane front face facing the strip and a large central aperture aligned with the film gate, means to bias the pressure pad against the strip so as to hold the portion of the strip at the plotting station flat against the backup plate during scribing when the strip is stationary, means to shift the pressure pad against the action of the biasing means to a position away from the strip for longitudinal movement of the film, means to shift the stylus from a position in which the scribing tip thereof is spaced from the film strip to a position in which said tip scribably engages the opaque scribable coating, means to shift the stylus for scribing from any point to any other point in a framelet on the strip in a plane parallel to the plane of the film strip at the plotting station and while the strip is stationary, means to direct light to one side of the strip at the plotting station, and a projection lens on the other side of the strip at the plotting station.

2. A projector as set forth in claim 1 wherein the film strip moving means includes a coarse film transport means to locate any selected framelet of the strip approximately at the plotting station, a fine film registering means to position the selected framelet precisely at said station, and means to operate said transport means and registering means in a sequence such that the transport means is first actuated while the registering means is idle and then the registering means is actuated while the transport means is idle.

3. A projector as set forth in claim 2 wherein the coarse film transport means always moves a selected framelet of the film strip to the plotting station in the same direction of movement of the film strip regardless of whether the selected framelet is closer to or further from a given end of the film strip than the framelet last at the plotting station, and wherein the film registering means always inches the selected framelet to its precise final position by movement of the film strip in the same direction from its approximate location to its final precise location.

4. A projector as set forth in claim 3 wherein when the film is moved to locate a selected framelet at the plotting station which selected framelet is closer to an end of the film strip than the last framelet at the plotting sation, the selected framelet is moved directly to near but not precisely at the final precise position thereof at the plotting station, and wherein when the film is moved to locate a selected framelet at the plotting station which selected framelet is further from said end of the film strip than the last framelet at the plotting station the selected framelet is moved directly to beyond the plotting station and then is reversed and moved near to but not precisely at its final precise position at the plotting station.

5. A projector as set forth in claim 2 wherein the coarse film transport means constitutes a sprocket drive with sprocket teeth engaging sprocket holes in the film strip remote from the plotting station, and wherein the fine film registering means comprises a pin having a tapered tip arranged to engage a sprocket hole at the plotting station.

6. A projector as set forth in claim 5 wherein the tapered tip of the registration pin has a flat face which is sloped in the direction of the length of the film strip making an acute angle with the plane of the film strip at the plotting station so as to shift the film strip in the direction of its length when the film strip is engaged thereby.

7. A projector as set forth in claim 5 wherein the tapered tip of the registration pin has a flat face which is sloped in a direction perpendicular to the length of the film strip making an acute angle with the plane of the film strip at the plotting station so as to shift the film strip transversely when the film strip is engaged thereby.

8. A projector as set forth in claim 5 wherein a solenoid is employed to shift the registration pin and wherein a dashpot is included to retard movement of the registration pin by the solenoid.

9. A projector as set forth in claim 2 wherein the coarse film transporting means includes film drive sprockets on opposite ends of the plotting station, said sprockets having pins engaging sprocket holes in the film strip to positively advance the film strip from both ends of the plotting station in either of opposite directions of movement of the film strip.

10. A projector as set forth in claim 1 wherein the opaque scribable coating constitutes a layer of a pigmented opaque resinous material on a surface of the support and an opaque thin metal film coating of a few microns thickness on the layer, said layer being thicker than said metal film coating.

11. A projector as set forth in claim 1 wherein the opaque thin metal film coating is deposited by vacuum evaporation on the resinous layer.

12. A projector as set forth in claim 1 wherein means is included to direct a jet of air against the tip of the stylus.

13. A dynamic plotting projector for information display, said projector constituting a film track having a plotting station and a film gate aligned therewith, a film strip comprising a flexible transparent support with an opaque scribable coating thereon, means to intermittently move the film longitudinally with respect to the plotting station so as to locate any desired framelet of said strip at said station, a scribing stylus at the plotting station on the same side of the strip as the scribable coating and generally perpendicular thereto, a stationary transparent backup plate at the plotting station on the side of said strip opposite to the stylus, the surface of said plate facing the film strip being plane and uninterrupted, a pressure pad at the plotting station on the same side of the film strip as the stylus, said pad constituting a member with a plane front face facing the strip and a large central aperture aligned with the film gate, means to bias the pressure pad against the strip so as to hold the portion of the strip at the plotting station flat against the backup plate during scribing when the strip is stationary, means to shift the pressure pad against the action of the biasing means to a position away from the strip for longitudinal movement of the film, means to shift the stylus from a position in which the scribing tip thereof is spaced from the film strip to a position in which said tip scribably engages the opaque scribable coating, means to shift the stylus for scribing from any point to any other point in a framelet on the strip in a plane parallel to the plane of the film strip at the plotting station and while the strip is stationary, said last-named stylus shifting means comprising a stationary member, a first carriage, means mounting the first carriage on the stationary member for movement relative thereto in a first orthogonal direction, a second carriage, means mounting the second carriage on the first carriage for movement relative thereto in a second orthogonal direction and the means shifting the stylus toward and away from the film strip being mounted on the second carriage for movement of the stylus relative thereto, the means to mount the first carriage on the stationary element constituting a shaft member extending in a direction parallel to the first orthogonal direction and a bushing member slidable on the shaft member, one of said members being secured to the stationary element and the other member being secured to the first carriage, and a second pair of mutually slidably engageable members, one mounted on the first carriage and the other on the stationary element for preventing rotation of the first carriage with respect to the shaft, means to direct light to one side of the strip at the plotting station, and a projection lens on the other side of the strip at the plotting station.

14. A dynamic plotting projector for information display, said projector constituting a film track having a plotting station and a film gate aligned therewith, a film strip comprising a flexible transparent support with an opaque scribable coating thereon, means to intermittently move the film longitudinally with respect to the plotting station so as to locate any desired framelet of said strip at said station, a scribing stylus at the plotting station on the same side of the strip as the scribable coating and generally perpendicular thereto, a stationary transparent backup plate at the plotting station on the side of said strip opposite to the stylus, the surface of said plate facing the film strip being plane and uninterrupted, a pressure pad at the plotting station on the same side of the film strip as the stylus, said pad constituting a member with a plane front face facing the strip and a large central aperture aligned with the film gate, means to bias the pressure pad against the strip so as to hold the portion of the strip at the plotting station flat against the backup plate during scribing when the strip is stationary, means to shift the pressure pad against the action of the biasing means to a position away from the strip for longitudinal movement of the film, means to shift the stylus from a position in which the scribing tip thereof is spaced from the film strip to a position in which said tip scribably engages the opaque scribable coating, means to shift the stylus for scribing from any point to any other point in a framelet on the strip in a plane parallel to the plane of the film strip at the plotting station and while the strip is stationary, said last-named stylus shifting means comprising a stationary member, a first carriage, means mounting the first carriage on the stationary member for movement relative thereto in a first orthogonal direction, a second carriage, means mounting the second carriage on the first carriage for movement relative thereto in a second orthogonal direction and the means shifting the stylus toward any away from the film strip being mounted on the second carriage for movement of the stylus relative thereto, the means to mount the second carriage on the first carriage constituting a shaft member extending in a direction parallel to the second orthogonal direction and a bushing member slidable on the shaft member, one of said members being secured to the first carriage and the other member being secured to the second carriage, and a second pair of mutually slidably engageable members one mounted on the first carriage and the other on the second carriage for preventing rotation of the second carriage with respect to the shaft, means to direct light to one side of the strip at the plotting station, and a projection lens on the other side of the strip at the plotting station.

15. A dynamic plotting projector for information display, said projector constituting a film track having a plotting station and a film gate aligned therewith, a film strip comprising a flexible transparent support with an opaque scribable coating thereon, means to intermittently move the film longitudinally with respect to the plotting station so as to locate any desired framelet of said strip at said station, a scribing stylus at the plotting station on the same side of the strip as the scribable coating and generally perpendicular thereto, a stationary transparent backup plate at the plotting station on the side of said strip opposite the stylus, the surface of said plate facing the film strip being plane and uninterrupted, a pressure pad at the plotting station on the same side of the film strip as the film strip as the stylus, said pad constituting a member with a plane front face facing the strip and a large central aperture aligned with the film gate, means to bias the pressure pad against the strip so as to hold the portion of the strip at the plotting sation flat against the backup plate during scribing when the strip is stationary, means to shift the pressure pad against the action of the biasing means to a position away from the strip for longitudinal movement of the film, means to shift the stylus from a position in which the scribing tip thereof is spaced from the film strip to a position in which said tip scribably engages the opaque scribable coating, means to sift the stylus for scribing from any point to any other point in a framelet on the strip in a plane parallel to the plane of the film strip at the plotting station and while the strip is stationary, said last-named stylus shifting means comprising a stationary member, a first carriage, means mounting the first carriage on the stationary member for movement relative thereto in a first orthogonal direction, a second carriage, means mounting the second carriage on the first carriage for movement relative thereto in a second orthogonal direction and the means shifting the stylus toward and away from the film strip being mounted on the second carriage for movement of the stylus relative thereto, each carriage including means to drive the same in a different orthogonal direction, at least one of said driving means including a drive shaft and a flexible inelastic belt secured intermediate its ends to the drive shaft with the opposite ends of the belt secured to spaced points on said carriage on opposite sides of the drive shaft, said belt being of wishbone configuration with the shank of the wishbone passing between the legs of the wishbone and forming therewith a loop, said loop being trained about the shaft and means to tension said belt, means to direct light to one side of the strip at the plotting station, and a projection lens on the other side of the strip at the plotting station.

16. A projector as set forth in claim 15 wherein both carriages are driven by like belts, one of the belts having its ends attached directly to the first carriage and the other of the belts having its ends attached to an element which is mounted on the second carriage for movement relative thereto in a direction of movement of the first carriage and for movement with the second carriage in the direction of movement of the second carriage.

17. A dynamic plotting projector for information display, said projector constituting a film track having a plotting station and a film gate aligned therewith, a film strip comprising a flexible transparent support with an opaque scribable coating thereon, means to intermittently move the film longitudinally with respect to the plotting station so as to locate any desired framelet of said strip at said station, a scribing stylus at the plotting station on the same side of the strip as the scribable coating and generally perpendicular thereto, a stationary transparent backup plate at the plotting station on the side of said strip opposite to the stylus, the surface of said plate facing the film strip being plane and uninterrupted, a pressure pad at the plotting station on the same side of the film strip as the stylus, said pad constituting a member with a plane front face facing the strip and a large central aperture aligned with the film gate, means to bias the pressure pad against the strip so as to hold the portion of the strip at the plotting station flat against the backup plate during scribing when the strip is stationary, means to shift the pressure pad against the action of the biasing means to a position away from the strip for longitudinal movement of the film, means to shift the stylus from a position in which the scribing tip thereof is spaced from the film strip to a position in which said tip scribably engages the opaque scribable coating, means to shift the stylus for scribing from any point to any other point in a framelet on the strip in a plane parallel to the plane of the film strip at the plotting station and while the strip is stationary, said last-named stylus shifting means comprising a stationary member, a first carriage, means mounting the first carriage on the stationary member for movement relative thereto in a first orthogonal direction, a second carriage, means mounting the second carriage on the first carriage for movement relative thereto in a second orthogonal direction and the means shifting the stylus toward and away from the film strip being mounted on the second carriage for movement of the stylus relative thereto, the means shifting the stylus toward and away from the film strip including a transparent stylus plate, means mounting the stylus on the plate for axial movement perpendicular thereto and a pivotal connection between said plate and the second carriage, said pivot connection being for rotation about an axis perpendicular to the Z direction, means to direct light to one side of the strip at the plotting station, and a projection lens on the other side of the strip at the plotting station.

18. A projector as set forth in claim 17 wherein the stylus plate includes a bushing in which the stylus is slidably mounted for movement toward and away from the film strip at the plotting station.

19. A projector as set forth in claim 17 wherein means is included to axially bias the tip of the stylus to a position protruding from the plate and toward the film strip at the projection station.

20. A projector as set forth in claim 19 wherein the biasing means includes a wire under tension bearing on the end of the stylus remote from the tip thereof and resilient means carried by the stylus plate to support the ends of the wire from said plate.

21. A projector as set forth in claim 20 wherein the resilient supporting means constitutes a pair of cantilever leaf springs carried by the stylus plate and having the ends of the wire attached thereto at points spaced from the plate.

References Cited
UNITED STATES PATENTS

| | | | |
|---|---|---|---|
| 1,919,116 | 7/1933 | Miller | 274—46 |
| 2,506,500 | 7/1950 | Hardy | 346—77 |
| 2,841,065 | 7/1958 | Gage et al. | 350—315 X |
| 2,859,659 | 11/1958 | Fenske et al. | 88—24 |
| 2,918,343 | 12/1959 | Guillot | 346—17 X |
| 3,151,927 | 10/1964 | Angst et al. | 346—25 |

RICHARD B. WILKINSON, *Primary Examiner.*

J. H. HARTARY, *Assistant Examiner.*

U.S. Cl. X.R.

346—29, 77; 353—44